(12) United States Patent
Wood

(10) Patent No.: US 8,382,194 B2
(45) Date of Patent: Feb. 26, 2013

(54) OUTBOARD WAKE STABILIZATION DEVICE AND METHOD FOR REDUCING THE AERODYNAMIC DRAG OF GROUND VEHICLES

(76) Inventor: Richard M. Wood, Virginia Beach, VA (US)

(*) Notice: Subject to any disclaimer, the term of this patent is extended or adjusted under 35 U.S.C. 154(b) by 308 days.

(21) Appl. No.: 12/381,049

(22) Filed: Mar. 6, 2009

(65) Prior Publication Data
US 2009/0236872 A1    Sep. 24, 2009

Related U.S. Application Data

(60) Provisional application No. 61/070,085, filed on Mar. 21, 2008.

(51) Int. Cl.
    *B62D 35/00*      (2006.01)
(52) U.S. Cl. .................. 296/180.4; 296/180.5
(58) Field of Classification Search .............. 296/180.1, 296/2, 3, 4, 5, 91
See application file for complete search history.

(56) References Cited

U.S. PATENT DOCUMENTS

| | | | |
|---|---|---|---|
| 2,569,983 A | 10/1951 | Favre | |
| 2,605,119 A | 7/1952 | Maxwell | |
| 2,737,411 A | 3/1956 | Potter | |
| 2,935,361 A | 5/1960 | Aske | |
| 3,010,754 A * | 11/1961 | Shumaker | 296/91 |
| 3,348,873 A | 10/1967 | Saunders | |
| 3,415,566 A | 12/1968 | Kerrigan | |
| 3,697,120 A | 10/1972 | Saunders | |
| 3,834,572 A | 9/1974 | Eskenazi | |
| 3,854,769 A | 12/1974 | Saunders | |
| 3,866,967 A | 2/1975 | Landry et al. | |
| 3,934,922 A | 1/1976 | MacCready, Jr. et al. | |
| 3,945,677 A | 3/1976 | Servais et al. | |
| 3,960,402 A * | 6/1976 | Keck | 296/180.4 |
| 3,971,586 A | 7/1976 | Saunders | |
| 3,999,797 A | 12/1976 | Kirsch et al. | |
| 4,006,932 A | 2/1977 | McDonald | |
| 4,021,069 A | 5/1977 | Hersh | |
| 4,030,779 A | 6/1977 | Johnson | |
| 4,035,013 A | 7/1977 | Abbott, III | |

(Continued)

FOREIGN PATENT DOCUMENTS

| | | |
|---|---|---|
| DE | 3115742 A1 | 11/1982 |
| GB | 2063799 A | 6/1981 |

(Continued)

OTHER PUBLICATIONS

Ludkring; "Reynolds Number and Leading-Edge Bluntness Effects on a 65° Delta Wing"; 40th Aiaa Aerospace Sciences Meeting & Exhibit; Jan. 14, 2002; 16 Pages.

*Primary Examiner* — Glenn Dayoan
*Assistant Examiner* — Pinel Romain
(74) *Attorney, Agent, or Firm* — William Mullen

(57) ABSTRACT

An improved method and device for the reduction of aerodynamic drag and for improved performance of vehicles by increasing the pressure on the base of the trailing vehicle or vehicle component by controlling the boundary layer as it exists the vehicle trailing edge. The subject invention consists of a multiple panels located near the base area of a bluff base vehicle. The flow control objectives are accomplished by positioning minimally sized panels comprising the invention in close proximity to the side and top surfaces of the vehicle, where the leading edge of each panel is positioned in close proximity to the trailing edge of the vehicle. The side panels comprising the invention are laterally positioned outboard of the side surface of the vehicle. The top panels are vertically positioned above the top surface of the vehicle.

15 Claims, 26 Drawing Sheets

U.S. PATENT DOCUMENTS

| | | | |
|---|---|---|---|
| 4,068,883 A | 1/1978 | Meinecke et al. | |
| 4,113,299 A | 9/1978 | Johnson et al. | |
| 4,131,309 A | 12/1978 | Henke | |
| 4,170,378 A | 10/1979 | Jacobson | |
| 4,210,354 A | 7/1980 | Canning | |
| 4,214,787 A * | 7/1980 | Chain | 296/180.4 |
| 4,257,640 A | 3/1981 | Wiley | |
| 4,257,641 A | 3/1981 | Keedy | |
| 4,269,444 A | 5/1981 | Emory | |
| 4,284,302 A | 8/1981 | Drews | |
| 4,310,192 A | 1/1982 | Fitzgerald | |
| 4,316,630 A * | 2/1982 | Evans | 296/180.2 |
| 4,318,566 A | 3/1982 | Fitzjarrell | |
| 4,320,920 A | 3/1982 | Goudy | |
| 4,343,506 A | 8/1982 | Saltzman | |
| 4,360,232 A | 11/1982 | Elder | |
| 4,386,801 A | 6/1983 | Chapman et al. | |
| 4,401,338 A | 8/1983 | Caldwell | |
| 4,433,865 A | 2/1984 | Crompton, Jr. | |
| 4,451,074 A | 5/1984 | Scanlon | |
| 4,455,045 A | 6/1984 | Wheeler | |
| 4,458,936 A | 7/1984 | Mulholland | |
| 4,468,060 A | 8/1984 | FitzGerald et al. | |
| 4,486,046 A | 12/1984 | Whitney et al. | |
| 4,508,380 A | 4/1985 | Sankrithi | |
| 4,553,781 A | 11/1985 | Johnson | |
| 4,601,508 A | 7/1986 | Kerian | |
| 4,611,847 A | 9/1986 | Sullivan | |
| 4,640,541 A | 2/1987 | FitzGerald et al. | |
| 4,682,808 A | 7/1987 | Bilanin | |
| 4,688,841 A | 8/1987 | Moore | |
| 4,702,509 A | 10/1987 | Elliott, Sr. | |
| 4,706,910 A | 11/1987 | Walsh et al. | |
| 4,741,569 A | 5/1988 | Sutphen | |
| 4,746,160 A | 5/1988 | Wiesemeyer | |
| 4,756,256 A | 7/1988 | Rains et al. | |
| 4,789,117 A | 12/1988 | Paterson et al. | |
| 4,813,635 A | 3/1989 | Paterson et al. | |
| 4,818,015 A | 4/1989 | Scanlon | |
| 4,830,315 A | 5/1989 | Presz et al. | |
| 4,867,397 A | 9/1989 | Pamadi et al. | |
| 4,978,162 A | 12/1990 | Labbe | |
| D317,425 S | 6/1991 | Vysotsky et al. | |
| 5,058,837 A | 10/1991 | Wheeler | |
| 5,058,945 A | 10/1991 | Elliott et al. | |
| 5,236,347 A | 8/1993 | Andrus | |
| 5,240,306 A | 8/1993 | Flemming | |
| 5,277,444 A | 1/1994 | Stropkay | |
| 5,280,990 A * | 1/1994 | Rinard | 296/180.1 |
| 5,322,340 A | 6/1994 | Sato et al. | |
| 5,332,280 A | 7/1994 | Dupont et al. | |
| 5,348,366 A | 9/1994 | Baker et al. | |
| 5,374,013 A | 12/1994 | Bassett et al. | |
| 5,375,903 A | 12/1994 | Lechner | |
| D354,726 S | 1/1995 | Fitzgerald et al. | |
| 5,487,586 A | 1/1996 | Kinkaide | |
| 5,498,059 A | 3/1996 | Switlik | |
| 5,513,893 A | 5/1996 | Nakata et al. | |
| 5,536,062 A | 7/1996 | Spears | |
| 5,609,384 A | 3/1997 | Loewen | |
| 5,658,038 A | 8/1997 | Griffin | |
| 5,685,597 A | 11/1997 | Reid | |
| 5,791,724 A | 8/1998 | Wesley | |
| 5,823,610 A | 10/1998 | Ryan et al. | |
| 5,887,280 A | 3/1999 | Waring | |
| 5,908,217 A | 6/1999 | Englar | |
| 5,921,617 A | 7/1999 | Loewen | |
| 5,947,548 A | 9/1999 | Carper | |
| D415,085 S | 10/1999 | Fitzgerald | |
| 6,092,861 A | 7/2000 | Whelan | |
| 6,257,654 B1 * | 7/2001 | Boivin et al. | 296/180.5 |
| 6,276,636 B1 | 8/2001 | Krastel | |
| 6,286,892 B1 | 9/2001 | Bauer et al. | |
| 6,286,894 B1 | 9/2001 | Kingham | |
| 6,309,010 B1 | 10/2001 | Whitten | |
| 6,409,194 B1 | 6/2002 | Voas | |
| 6,409,252 B1 | 6/2002 | Andrus | |
| 6,412,853 B1 | 7/2002 | Richardson | |
| 6,428,084 B1 | 8/2002 | Liss | |
| 6,457,766 B1 | 10/2002 | Telnack | |
| 6,467,833 B1 | 10/2002 | Travers | |
| 6,485,087 B1 * | 11/2002 | Roberge et al. | 296/180.5 |
| 6,502,383 B1 | 1/2003 | Janardan et al. | |
| 6,595,578 B1 | 7/2003 | Calsoyds et al. | |
| 6,616,218 B2 | 9/2003 | Bauer et al. | |
| 6,634,700 B1 | 10/2003 | Clavert | |
| 6,644,720 B2 | 11/2003 | Long et al. | |
| 6,666,498 B1 | 12/2003 | Whitten | |
| 6,702,364 B2 | 3/2004 | Neel | |
| 6,742,616 B2 | 6/2004 | Leban | |
| 6,789,492 B2 | 9/2004 | Latorre | |
| 6,789,839 B1 | 9/2004 | Samuelson | |
| 6,799,791 B2 * | 10/2004 | Reiman et al. | 296/180.1 |
| 6,854,788 B1 | 2/2005 | Graham | |
| 6,877,793 B2 | 4/2005 | Cory | |
| 6,886,882 B2 | 5/2005 | Farlow et al. | |
| 6,899,369 B2 | 5/2005 | Neel | |
| 6,959,958 B2 * | 11/2005 | Basford | 296/180.1 |
| 6,974,178 B2 | 12/2005 | Ortega et al. | |
| 6,979,049 B2 | 12/2005 | Ortega et al. | |
| 7,008,004 B2 | 3/2006 | Ortega et al. | |
| 7,008,005 B1 | 3/2006 | Graham | |
| 7,073,845 B2 | 7/2006 | Ortega et al. | |
| 7,093,889 B2 | 8/2006 | Graham | |
| 7,100,969 B2 | 9/2006 | Choi et al. | |
| 7,104,591 B1 | 9/2006 | Sanns | |
| 7,147,270 B1 | 12/2006 | Andrus et al. | |
| 7,152,908 B2 | 12/2006 | Shahbazi | |
| 7,207,620 B2 | 4/2007 | Cosgrove et al. | |
| 7,240,958 B2 | 7/2007 | Skopic | |
| 7,255,387 B2 | 8/2007 | Wood | |
| 7,497,502 B2 | 3/2009 | Wood | |
| 7,585,015 B2 * | 9/2009 | Wood | 296/180.4 |
| 7,618,086 B2 | 11/2009 | Breidenbach | |
| 7,740,303 B2 | 6/2010 | Wood | |
| 7,748,771 B2 * | 7/2010 | Distel et al. | 296/180.4 |
| 7,854,468 B2 * | 12/2010 | Vogel et al. | 296/180.1 |
| 7,950,720 B2 * | 5/2011 | Skopic | 296/180.1 |
| 8,100,461 B2 * | 1/2012 | Smith et al. | 296/180.4 |
| 2002/0021023 A1 | 2/2002 | Leban | |
| 2002/0030384 A1 * | 3/2002 | Basford | 296/180.1 |
| 2003/0011210 A1 | 1/2003 | Cory | |
| 2003/0205913 A1 | 11/2003 | Leonard | |
| 2004/0239146 A1 | 12/2004 | Ortega | |
| 2005/0012358 A1 | 1/2005 | Choi | |
| 2005/0040669 A1 | 2/2005 | Wood | |
| 2006/0232102 A1 | 10/2006 | Steel | |
| 2009/0200834 A1 | 8/2009 | Vogel | |
| 2009/0236872 A1 | 9/2009 | Wood | |
| 2009/0256386 A1 | 10/2009 | Wood | |
| 2009/0295189 A1 | 12/2009 | Distel | |

FOREIGN PATENT DOCUMENTS

| | | |
|---|---|---|
| GB | 2098558 A | 11/1982 |
| JP | 11115830 | 4/1999 |
| WO | WO 2004062953 | 7/2004 |

\* cited by examiner

Horizontal Section Cut

Horizontal Section Cut

Horizontal Section Cut

Vertical Section Cut

Vertical Section Cut

Vertical Section Cut

Close Up View from FIG. 9b

Cut Away View of Mechanism

B - B

OUTBOARD WAKE STABILIZATION DEVICE AND METHOD FOR REDUCING THE AERODYNAMIC DRAG OF GROUND VEHICLES

CROSS-REFERENCE TO RELATED APPLICATIONS

This application claims benefit of U.S. Provisional Application No. 61/070,085, filed Mar. 21, 2008, the entire content of which is incorporated herein by reference.

ORIGIN OF THE INVENTION

The invention described herein was made by employees of the United States Government, and may be manufactured and used by or for the Government without payment of any royalties thereon or therefor.

FIELD OF INVENTION

The invention relates to the reduction of aerodynamic drag for moving ground vehicles; specifically to an improved method and device for the reduction of aerodynamic drag and for improved performance of ground vehicles by increasing the pressure on the base area of a vehicle or vehicle component by controlling the flow in wake of the vehicle or vehicle component.

BACKGROUND OF THE INVENTION

In the prior art there have been attempts to reduce the aerodynamic drag associated with the bluff base of the trailer of a tractor-trailer truck system. The wake flow emanating from the bluff base trailer is characterized as unsteady and dynamic. The unsteady nature of the wake flow is a result of asymmetric and oscillatory vortex shedding of the side surface and top surface flow at the trailing edge of the top and side surfaces of the vehicle. The boundary-layer flow passing along the top and side surfaces of the vehicle is at a low energy state and is unable to expand around the corner defined by the intersection of the side or top surfaces with the base surface. The boundary-layer flow separates at the trailing edge of the top and side surfaces and forms rotational-flow structures that comprise the bluff-base wake flow. The low energy flow separating at the trailing edges of the side surfaces and top surface of the trailer is unable to energize and stabilize the low energy bluff-base wake flow. The large rotational-flow structures comprising the wake interact with each other imparting an unsteady pressure loading on the vehicle base. The resulting flow interaction in the vehicle wake and unsteady pressure loading on the vehicle base contributes to the low pressures acting on the vehicle base and therefore high drag force. The resulting bluff-base wake-flow structure emanating from the base area of the vehicle is comprised of the vortex structures that are shed from trailing edges of the side surfaces and top surface of the vehicle. Contributing to the low-energy bluff-base wake is the low-energy turbulent flow that exits from the vehicle undercarriage at the base of the vehicle. The unsteady wake flow imparts a low pressure onto the aft facing surface of the trailer base that results in significant aerodynamic drag. Prior art has addressed the bluff base flow phenomena by adding to or installing various devices to the bluff base region. Examples of these devices are: a contoured three-dimensional aerodynamic surface referred to as a boat-tail; bluff base extensions/flaps/fairings/panels/plates which extend rearward from the side, top and/or lower surfaces that create a cavity; three or four surface panels/plates that extend rearward from the bluff base and are aligned approximately parallel to the side, top and/or lower surfaces of the vehicle and are designed to trap vortices shed from the trailing edges. All of these previous devices have geometrically-simple trailing edges and have an upstream edge that abuts the bluff base surface. Prior art also show the forcing the side surface and top surface flow into the base region through the use of turning vanes or jets of air.

Prior art has used the aerodynamic boat-tail fairings applied to the trailer base in order to eliminate flow separation and associated drag, see U.S. Pat. Nos. 4,458,936, 4,601,508, 4,006,932, 4,451,074, 6,092,861, 4,741,569, 4,257,641, 4,508,380, 4,978,162 and 2,737,411. These representative aerodynamic boat-tail fairing devices, while successful in eliminating flow separation, are complex devices that are typically comprised of moving parts that require maintenance and add weight to the vehicle. These devices take a variety of form and may be active, passive, rigid, flexible and/or inflatable. These attributes have a negative impact on operational performance and interfere with normal operations of the vehicle.

Other concepts as documented in U.S. Pat. Nos. 5,348,366 and 4,682,808 consist of three or four plates/panels that are attached to the base of a trailer or extend from support mechanisms that are attached to the base of a trailer. These devices operate by trapping the separated flow in a preferred position in order to create an effective aerodynamic boat-tail shape. These representative trailer base devices, while successful in reducing the drag due to base flow are complex devices that are typically comprised of moving parts that require maintenance and add weight to the vehicle. All of these devices add significant weight to the vehicle. These attributes have a negative impact on operational performance and interfere with normal operations of the vehicle.

U.S. Pat. Nos. 3,010,754, 5,280,990, 2,569,983 and 3,999,797 apply a flow turning vane to the outer perimeter of the trailer base on the sides and top to direct the flow passing over the sides and top of the trailer into the wake in order to minimize the drag penalty of the trailer base flow. These devices provide a drag reduction benefit but they require maintenance and interfere with normal operations of the trailers fitted with swinging doors. These devices also add weight to the vehicle that would have a negative impact on operational performance of the vehicle.

Several concepts employ pneumatic concepts to reduce the aerodynamic drag of tractor-trailer truck systems. U.S. Pat. No. 5,908,217 adds a plurality of nozzles to the outer perimeter of the trailer base to control the flow turning from the sides and top of trailer and into the base region. U.S. Pat. No. 6,286,892 adds a porous surface to the trailer base and to the sides and top regions of the trailer abutting the trailer base. These porous surfaces cover a minimum depth plenum that is shared by the sides, top and base regions of the trailer. These two patents provide a drag reduction benefit but as with the other devices discussed previously these devices are complex devices, comprised of moving parts, interfere with normal operations of the truck and add weight to the vehicle. These characteristics of the devices result in a negative impact on the vehicle operational performance.

SUMMARY OF THE INVENTION

The object of the invention is to eliminate the interaction of naturally occurring large-scale vertical wake flow structures by separating the viscous boundary layer flow from the high-energy free stream flow as it exits the trailing edge of the side and/or top surfaces of a vehicle. The subject invention consists of a multiple panels located near the base area of a bluff base vehicle. The flow control objectives are accomplished by positioning minimally sized panels comprising the invention in close proximity to the side and top surfaces of the vehicle, where the leading edge of each panel is positioned in close proximity to the trailing edge of the vehicle. The side panels comprising the invention are laterally positioned outboard of the side surface of the vehicle. The top panels are vertically positioned above the top surface of the vehicle. The proper placement of the panels allows the side and top surface low velocity boundary layer flow to pass into the gap region located between the vehicle side and top surfaces and the inward facing surfaces of the panels of the subject invention. The high velocity free stream flow outside of the boundary layer is allowed to pass over the outward facing surfaces of the panels comprising the subject invention. The separation of the low velocity boundary layer flow from the high velocity free stream flow reduces the formation of the large eddies that form in the vehicle wake and which impart the low pressures and high drag force on the bluff base region of the vehicle. The use of boundary layer control technologies in the design of a wake stabilization device for a vehicle is dependent upon the vehicle geometry, operational requirements, and maintenance requirements. Controlling the boundary layer flow on the side surfaces is accomplished with vertically orientated panels that extend aft beyond the bluff base a distance that is less than the vehicle width and can be configured with a complex, planar, geometrically shaped trailing edge. Controlling the boundary layer flow on the top surface is accomplished with horizontally orientated panels that extends aft beyond the bluff base a distance that is less than the vehicle width and are configured with a complex, planar, geometrically shaped trailing edge. The control of the boundary layer flow allows the high velocity flow exiting the trailing edge of the panels comprising the invention to expand into the base region and provide drag reduction, increased fuel economy and improved operational performance. The trailing edge geometric shaping of the panels promotes turning of the external flow field thereby increasing the drag reduction benefit of the technology. Aerodynamic drag reduction is created by increasing the average pressure loading on the bluff-base aft-facing surface of the vehicle or vehicle component such as the trailer of a tractor-trailer truck. The invention relates to flow in the base region behind a bluff-base vehicle or vehicle component. The flow in the base region behind a bluff-base vehicle or vehicle component is a function of vehicle geometry, vehicle speed and the free stream flow direction.

The device provides improved performance for both the no crosswind condition, in which the air is still, as well as the condition when crosswind flow is present. For all moving vehicles that operate on the ground a crosswind flow is always present due to a combination of atmospheric and environmental factors and the interaction of the naturally occurring wind with stationary geological and manmade structures adjacent to the vehicle path as well as interfering flows from adjacent moving vehicles. The device is designed to reduce aerodynamic drag for the all cross wind conditions for single and multiple-component bluff-base vehicles. The subject device uses boundary layer control to allow the flow passing along the exterior top and side surfaces of a bluff-base ground vehicle to smoothly exit the vehicle at the trailing edge and pass into the wake. The subject device provides reduced aerodynamic drag for all of bluff-base ground vehicles.

The present invention is a simple device comprised of multiple panels that attach to the exterior surface of the bluff base of a ground vehicle or vehicle component. The spacing and orientation of the panels, comprising the device, are dependent upon the vehicle geometry and vehicle operating conditions.

The present invention pioneers a novel device that is comprised of multiple panels that are attached to the bluff base exterior surfaces of a bluff-base vehicle or vehicle component. The subject panels are located in close proximity to the side surfaces, top surface and rear surface of the vehicle. To maximize the ability of each panel to control the boundary layer the panels are aligned approximately parallel to the air flow direction along the sides and top surfaces of the vehicle. Each of the panels extends aft an equivalent distance. The panels are applied symmetrically to the vehicle about the centerline of the vehicle. Each of the panels may be comprised of multiple elements or segments and/or may be contain local gaps, holes, cutouts, and/or bumps in order to accommodate specific vehicle or vehicle component geometry.

For ground vehicles such as tractor-trailer trucks, which have a cross-section shape that is predominately rectangular or square, the panels will be predominately planar, except as required to accommodate vehicle specific geometric features. The flow passing over this class of vehicle is parallel to the vehicle centerline and moving aft along the vehicle surface. Each of the panels may be comprised of various segments that may vary in number, shape, width and orientation that is determined by vehicle geometry. The preferred embodiment of the invention is to have each panel, comprising the invention, extending over the full width and height of the vehicle. The trailing edge shape of each panel shall be similar and is a function of vehicle geometry and operating conditions. Panel trailing edge shape may be either linear and parallel to the vehicle base surface or may be defined as a complex geometric shape such as serrated, notched, curved, or sawtooth shape to stabilize the wake shed from the panel trailing edge.

The subject invention is designed to be a maintenance free device that does not interfere with typical operational procedures or add additional operational procedures to ensure successful operation of the device. For ground vehicles, such as tractor-trailer trucks, which typically have a door or doors located on the vehicle base, panels of the subject invention may attach to the side surfaces, top surface, base surface and/or door surface of the vehicle by means of an actuation and/or attachment systems that may consist of various mechanical support systems. The actuation and/or attachment system is designed to position the panels in the preferred orientation and to allow each panel to move to a stowed position as required by the normal operating characteristics of the vehicle. Each panel may be; attached as a rigid member that does not move, attached as a moveable panel that is stowed or deployed manually and locked in the open or closed position, attached as a movable panel that is stowed or deployed in response to the panel impacting another object or by a linkage when the doors are opened and closed, or attached as a movable panel that is stowed and deployed through a powered system linked to a sensor system.

The reduction of aerodynamic drag, improved operational performance and improved stability of multiple component vehicles is obtained by increasing the pressure loading on the bluff base of the vehicle or vehicle component. The pressure loading on the bluff base is increased by eliminating the interaction of the side edge and top edge separated flow structures and facilitate the side and top surface flow to smoothly transition from the vehicle trailing edges and turn into the wake region. The flow control is accomplished by controlling the side surface and top surface boundary layer as it exits the trailing edge of the vehicle. The invention separates the low velocity boundary layer flow from the high velocity free stream flow of the vehicle surfaces thereby allowing the boundary layer flow to pass into the base area and thereby allowing free stream flow to exit the panel trailing edge with minimal viscous effects. More specifically, this invention relates to a device and method for reducing aerodynamic drag utilizing minimum length panels that are specifically shaped, sized, and orientated to inhibit the formation and prohibit the interaction of large separated flow structures in the wake. The invention creates a stabilized vehicle wake, reduced unsteady flow-separation, increased pressures acting on the bluff base area and reduced vehicle aerodynamic drag. The structure and segmentation of the panels, the positioning of the panels, the streamwise extent of the panels, the vertical extent of the panels, and the trailing edge shape of the panels are the primary design variables that are used to determine the drag reduction capability of the device.

The invention may be used to reduce the drag of all existing and future ground vehicles (i.e., cars with trailers, tractor-trailer trucks, trains, etc.).

OBJECTS AND ADVANTAGES

Several objects and advantages of the present invention are:
(a) to provide a novel process to reduce the aerodynamic drag of vehicles;
(b) to provide a means to use boundary layer flow control to reduce aerodynamic drag;
(c) to provide a means to reduce the aerodynamic drag and improve the operational efficiency of vehicles;
(d) to provide a means to reduce the aerodynamic drag and improve the fuel efficiency of vehicles;
(e) to provide a means to conserve energy and improve the operational efficiency of vehicles;
(f) to provide a means to reduce the aerodynamic drag without a significant geometric modification to existing vehicles;
(g) to provide an aerodynamic drag reduction device that uses a minimum of panels;
(h) to allow the geometric details of each set of panels to be variable to meet the specific needs of the application;
(i) to allow the spacing, location, and orientation of each set of panels to be variable to meet the specific needs of the application;
(j) to create a high pressure and low aerodynamic drag forces on the bluff base of a vehicle to reduce the aerodynamic drag of the subject vehicle;
(k) to allow the device to be fabricated as a number of independent segments and parts that may be applied to an existing vehicle;
(l) to allow the device to be fabricated as a single independent unit that may be applied to an existing vehicle;
(m) to allow the device to be fabricated as an integral part of a vehicle;
(n) to allow for optimal positioning of each panel on the vehicle base surface;
(o) to have minimum weight and require minimum volume within the vehicle;
(p) to have the ability to automatically fold to a stowed position and deploy to a operational position with normal operational of the door system;
(q) to have minimum maintenance requirements;
(r) to have no impact on operational requirements.

Further objects and advantages are to provide a device that can be easily and conveniently used to minimize aerodynamic drag on any ground vehicle for the purposes of improving the operational performance of the vehicle. Still further objects and advantages will become apparent from a consideration of the ensuing description and drawings.

DETAILED DESCRIPTION OF THE INVENTION

The following descriptions are of exemplary embodiments of the invention only, and are not intended to limit the scope, applicability or configuration of the invention in any way. Rather the following description is intended to provide a convenient illustration for implementing various embodiments of the invention. As will become apparent, various changes may be made in the function and arrangement of the elements described herein without departing from the spirit and scope of the invention. For example, though not specifically described, many shapes, widths, leading edge shapes, spacing and orientation of the forward extended plurality of panels, candidate vehicles that can benefit from the device, fabrication means and material, attachments means and material should be understood to fall within the scope of the present invention.

Referring now in detail to the drawings, like numerals herein designate like numbered parts in the figures.

Figure 1:
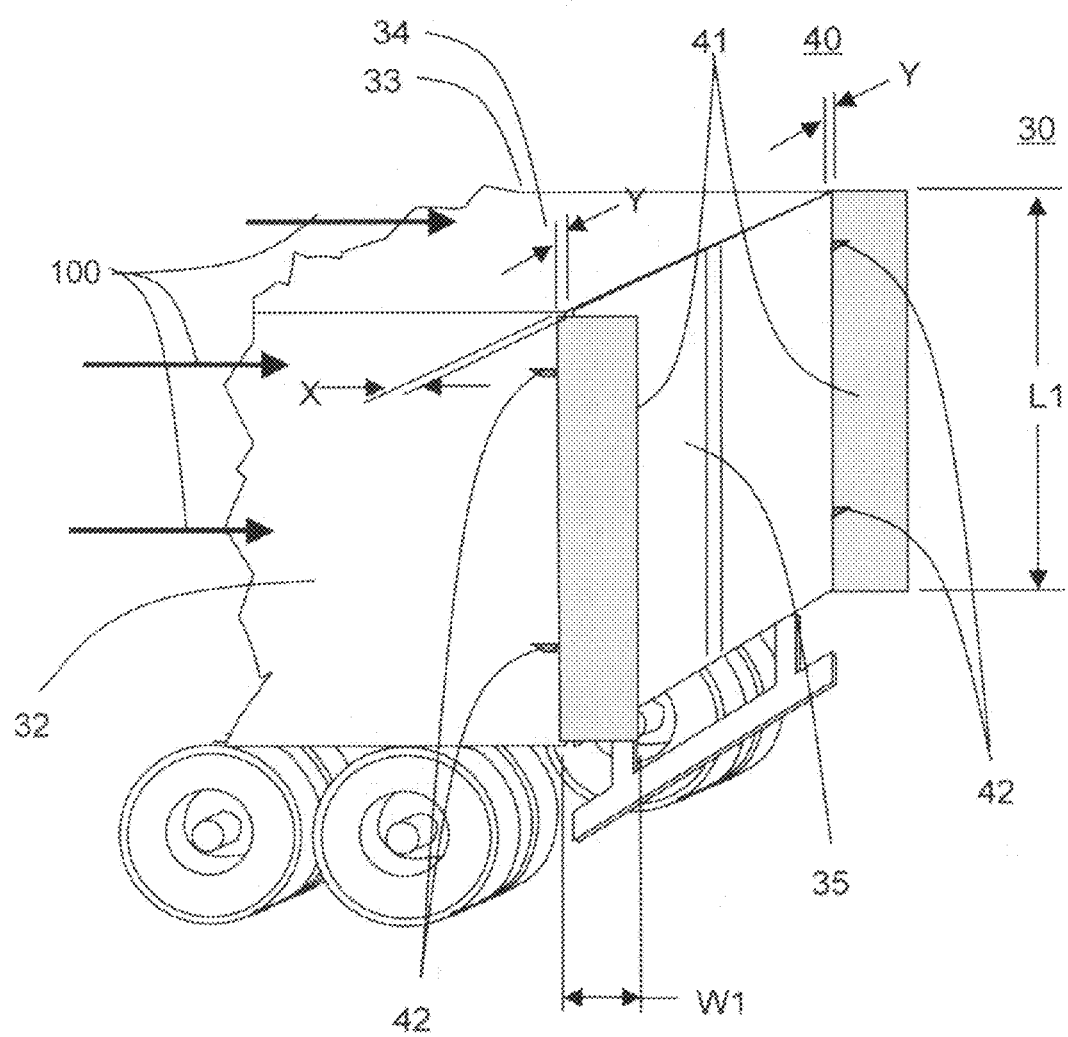
FIG. 1 is a rear perspective view of the aft most portion of a trailer of a tractor-trailer truck system with a non-moveable version of the subject invention installed on the trailer.

FIG. 1 is a rear perspective view of the aft portion of a typical trailer 30 of a tractor-trailer truck with the subject invention 40 installed on the trailer 30. The invention 40 is comprised of panels 41 and attachment hardware 42. The subject invention is comprised of panels 41 that are attached to the vehicle 30. The panels 41 are symmetrically positioned about the vehicle vertical plane of symmetry. Each panel 41 may be comprised of multiple elements and/or segments and may contain gaps, holes, cutouts and/or bumps in order to accommodate specific vehicle component geometry or operational features. Each panel has a width W1 and a length L1 and is positioned laterally outboard from the vehicle side a distance Y, where Y may be any value less than 25% of the vehicle width. The panel width W1 is less than the vehicle width. Each panel is positioned longitudinally such that the leading edge of each panel 41 is in close proximity to the vehicle trailing edge. The longitudinal dimension X between the vehicle trailing edge and the panel leading edge is less than 50 percent of the panel width W1. The length L1 of each panel 41 of the invention 40 is equivalent to the full vertical height of the vehicle base 30. The width W1 of each panel 41 of the invention 40 is determined by the geometric characteristics of the vehicle 30, the operational requirements of the vehicle 30 and the maintenance requirements of the vehicle 30. The type, size and structure of the attachment/actuation hardware 42 of the invention are determined by the geometric characteristics of the vehicle 30, the operational requirements of the vehicle 30 and the maintenance requirements of the vehicle 30.

Figure 12:
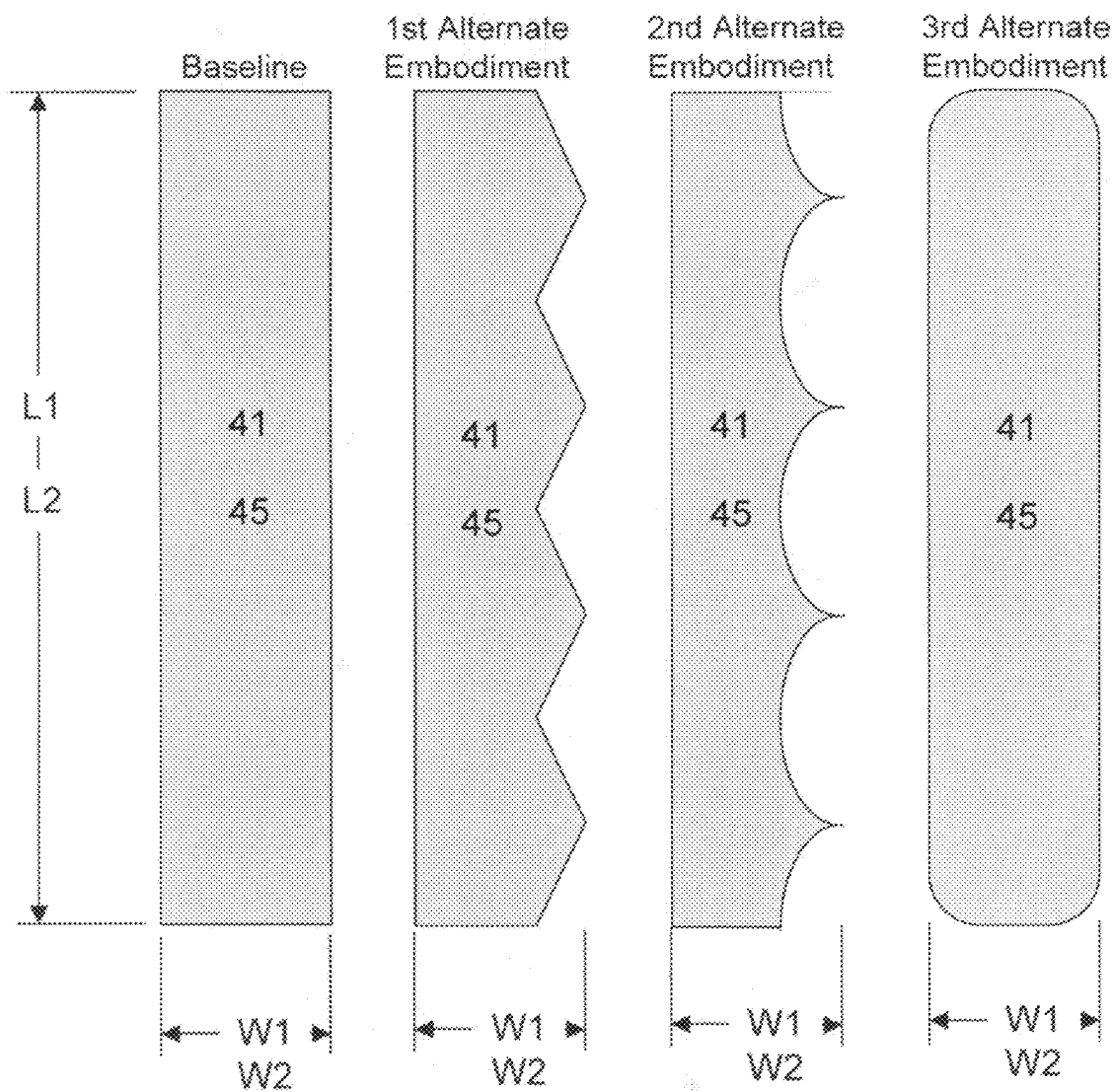
FIG. 12 are planform views of the various panel trailing edge shape concepts.
Figure 13:
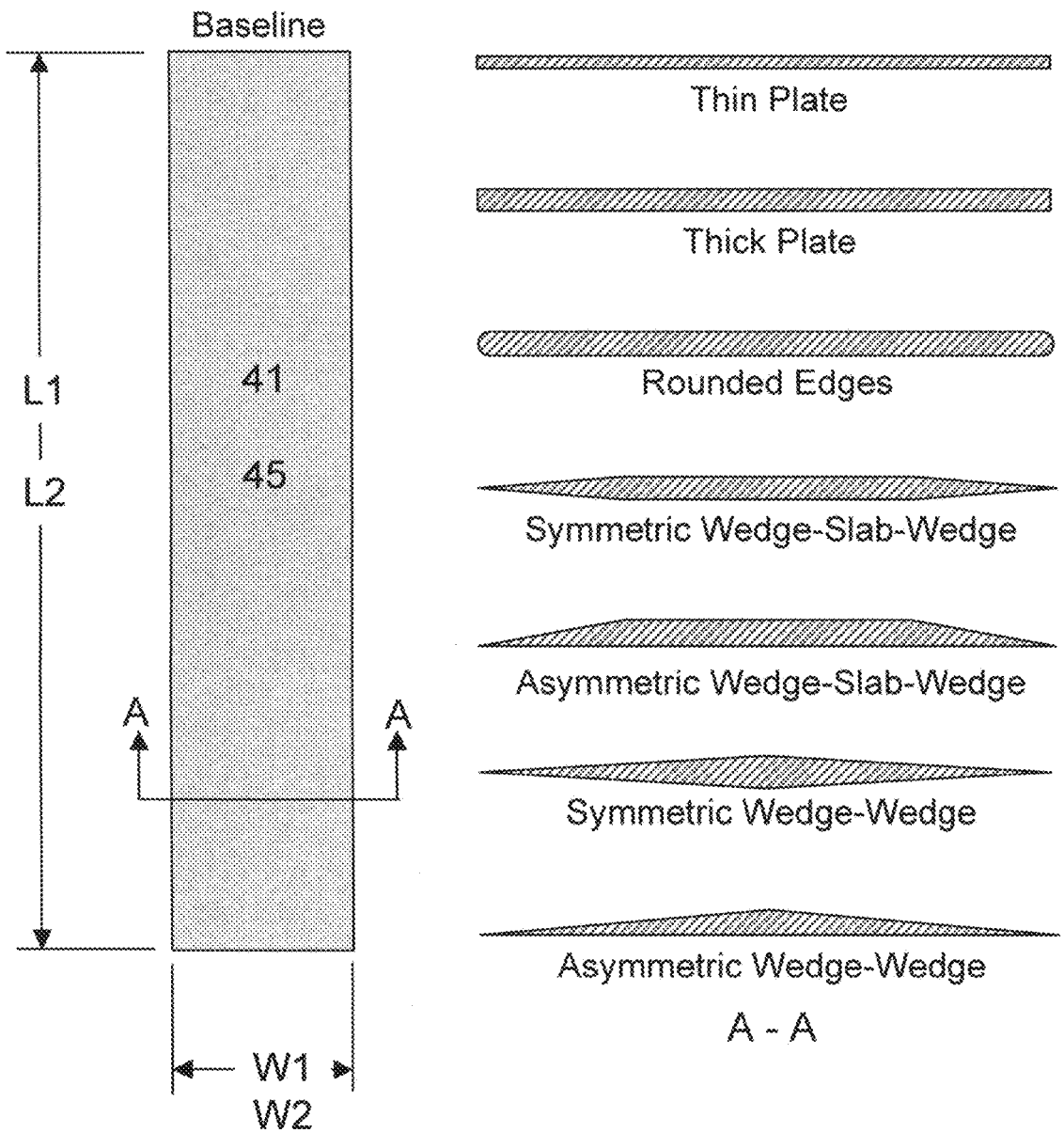
FIG. 13 are cross section views of the various panel cross section shape concepts.

The subject invention 40, comprised of components 41 and 42 provides aerodynamic drag reduction for all free stream flow 100 conditions including crosswind conditions. Aerodynamic drag reduction occurs when vehicle side surface 32 and 33 boundary layer portion of the flow 100 is separated from the free stream portion of the flow 100 at the leading edge of each panel 41 and the boundary layer flow is directed into the base wake region while the high velocity free stream flow continues to flow streamwise along the outer surface of each panel 41. The free stream portion of the flow 100 leaving each panel 41 trailing edge trailing edge turns into the base area region forming a virtual boattail structure. The effectiveness of the subject invention to reduce drag and thereby increase fuel economy of a vehicle is determined by the panel 41 width W1, length L1, position X and Y, planform shape as shown in FIG. 12 and airfoil shape as shown in FIG. 13.

Figure 2A:
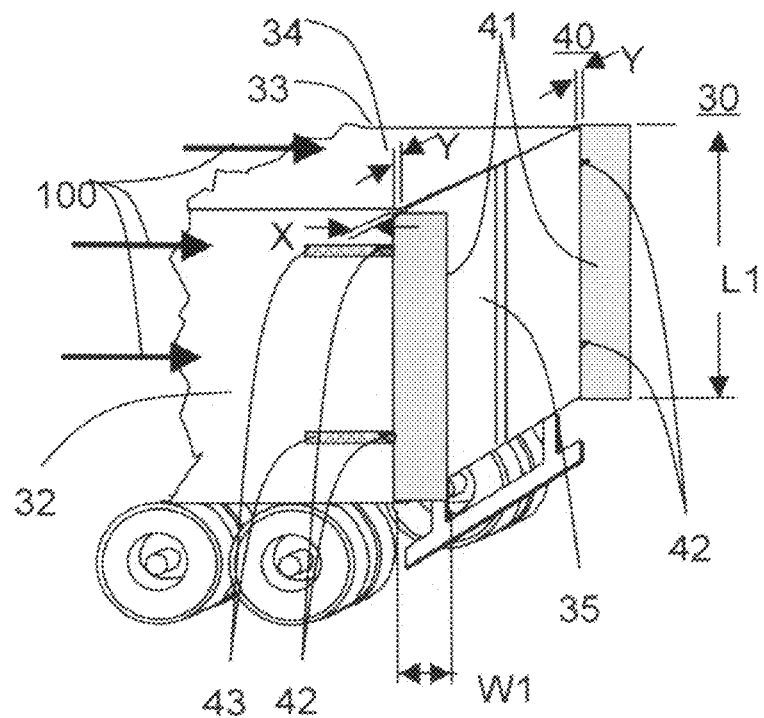
FIGS. 2a and 2b is a rear perspective view of the aft most portion of a trailer of a tractor-trailer truck system with a first and second moveable version of the subject invention installed on the trailer.

FIG. 2a is a rear perspective view of the aft portion of a typical trailer 30 of a tractor-trailer truck with an alternate embodiment of the subject invention 40 installed on the trailer 30. The invention 40 is comprised of panels 41 and attachment hardware 42 and actuation hardware 43. FIG. 2a show the subject invention 40 comprised of panels 41 that are attached to attachment hardware brackets 42 that in turn attach to actuation hardware 43 that in turn attach to the vehicle. The panels 41 are symmetrically positioned about the vehicle vertical plane of symmetry. Each panel has a width W1 and a length L1 and is positioned laterally outboard from the vehicle side a distance Y, where Y may be any value less than 25 percent of the vehicle width. The panel width W1 is less than the vehicle width. Each panel is positioned longitudinally such that the leading edge of each panel 41 is in close proximity to the vehicle trailing edge. The longitudinal dimension X between the vehicle trailing edge and the panel leading edge is less than 50 percent of the panel width W. The length L1 of each panel 41 of the invention 40 is equivalent to the full vertical height of the vehicle base 30. The width W1 of each panel 41 of the invention 40 is determined by the geometric characteristics of the vehicle 30, the operational requirements of the vehicle 30 and the maintenance requirements of the vehicle 30. The type, size and structure of the attachment/actuation hardware 42 of the invention are determined by the geometric characteristics of the vehicle 30, the operational requirements of the vehicle 30 and the maintenance requirements of the vehicle 30.

The subject invention 40, comprised of components 41, 42, 43 provides aerodynamic drag reduction for all free stream flow 100 conditions including crosswind conditions. Aerodynamic drag reduction occurs when vehicle side surface 32, 33 boundary layer portion of the flow 100 is separated from the free stream portion of the flow 100 at the leading edge of the panel 41 where the boundary layer flow is directed into the base wake region while the high velocity free stream flow continues to flow streamwise along the outer surface of each panel 41. The free stream portion of the flow 100 leaving each panel 41 trailing edge trailing edge turns into the base area region forming a virtual boattail structure. The effectiveness of the subject invention to reduce drag and thereby increase fuel economy of a vehicle is determined by the panel 41 width W1, length L1, position X and Y, planform shape as shown in FIG. 12 and airfoil shape as shown in FIG. 13.

Figure 2B:
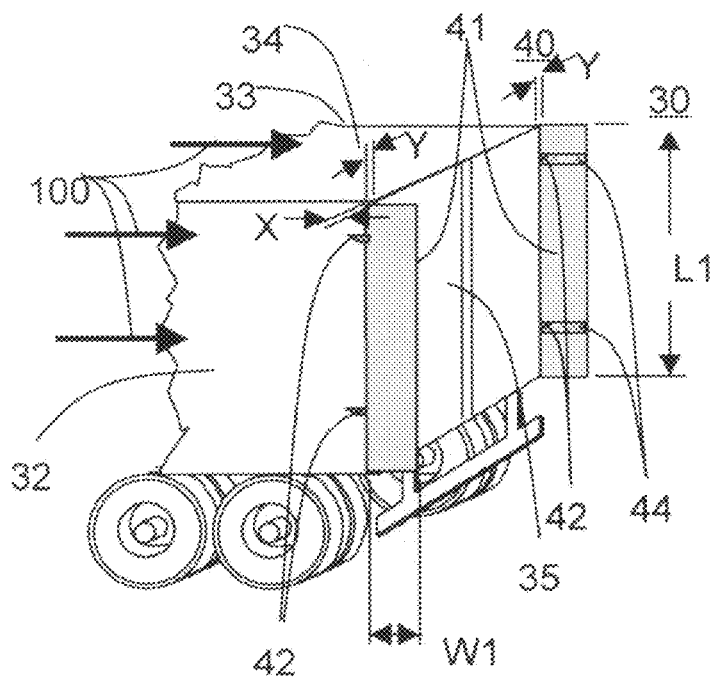

FIG. 2b is a rear perspective view of the aft portion of a typical trailer 30 of a tractor-trailer truck with an alternate embodiment of the subject invention 40 installed on the trailer 30. The invention 40 is comprised of panels 41 and attachment hardware 42 and actuation hardware 44. The subject invention is comprised of panels 41 that are attached to actuation hardware 44 that in turn attach to attachment hardware brackets 42 that in turn attach to the vehicle 30. The panels 41 are symmetrically positioned about the vehicle vertical plane of symmetry. Each panel has a width W1 and a length L1 and is positioned laterally outboard from the vehicle side a distance Y, where Y may be any value less than 25 percent of the vehicle width. The panel width W1 is less than the vehicle width. Each panel is positioned longitudinally such that the leading edge of each panel 41 is in close proximity to the vehicle trailing edge. The longitudinal dimension X between the vehicle trailing edge and the panel leading edge is less than 50 percent of the panel width W1. The length L1 of each panel 41 of the invention 40 is equivalent to the full vertical height of the vehicle base 35. The width W1 of each panel 41 of the invention 40 is determined by the geometric characteristics of the vehicle 30, the operational requirements of the vehicle 30 and the maintenance requirements of the vehicle 30. The type, size and structure of the attachment/actuation hardware 42 of the invention are determined by the geometric characteristics of the vehicle 30, the operational requirements of the vehicle 30 and the maintenance requirements of the vehicle 30.

The subject invention 40, comprised of components 41, 42, and 43, provides aerodynamic drag reduction for all free stream flow 100 conditions including crosswind conditions. Aerodynamic drag reduction occurs when vehicle side surface 32, 33 boundary layer portion of the flow 100 is separated from the free stream portion of the flow 100 at the leading edge of the panels 41 and the boundary layer flow is directed into the base wake region while the high velocity free stream flow continues to flow streamwise along the outer surface of each panel 41. The free stream portion of the flow 100 leaving each panel 41 trailing edge trailing edge turns into the base area region forming a virtual boattail structure. The effectiveness of the subject invention to reduce drag and thereby increase fuel economy of a vehicle is determined by the panel 41 width W1, length L1, position X and Y, planform shape as shown in FIG. 12 and airfoil shape as shown in FIG. 13.

Figure 3:
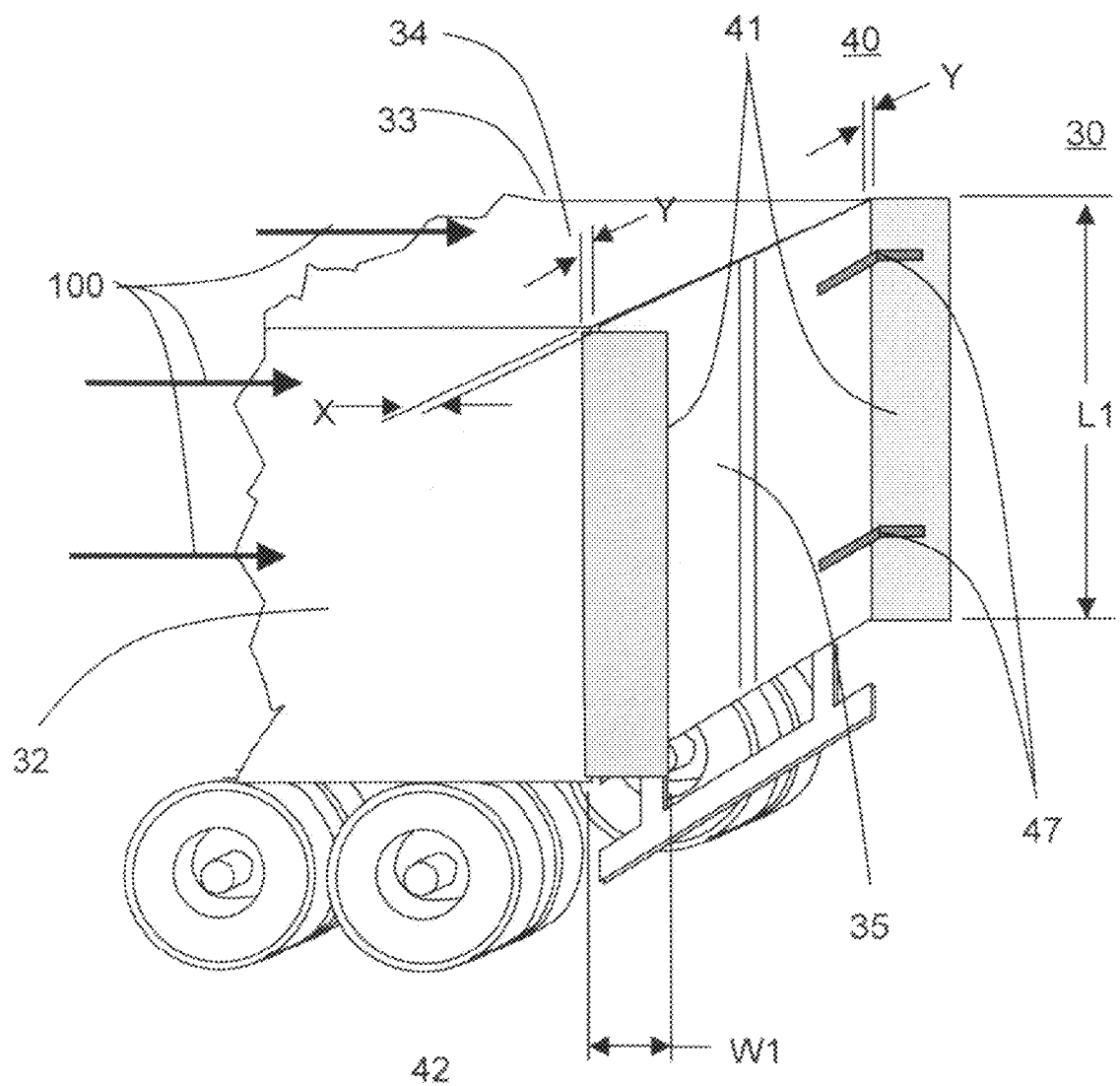
FIG. 3 is a rear perspective view of the aft most portion of a trailer of a tractor-trailer truck system with a third moveable version of the subject invention installed on the trailer.

FIG. 3 is a rear perspective view of the aft portion of a typical trailer 30 of a tractor-trailer truck with an alternate embodiment of the subject invention 40 installed on the trailer 30. The invention 40 is comprised of panels 41 and attachment/actuation hardware 47. The subject invention is comprised of panels 41 that are attached to actuation/attachment hardware 47 that in turn attach to the vehicle 30. The panels 41 are symmetrically positioned about the vehicle vertical plane of symmetry. Each panel has a width W1 and a length L1 and is positioned laterally outboard from the vehicle side a distance Y, where Y may be any value less than 25 percent of the vehicle width. The panel width W1 is less than the vehicle width. Each panel is positioned longitudinally such that the leading edge of each panel 41 is in close proximity to the vehicle trailing edge. The longitudinal dimension X between the vehicle trailing edge and the panel leading edge is less than 50 percent of the panel width W1. The length L1 of each panel 41 of the invention 40 is equivalent to the full vertical height of the vehicle base 35. The width W1 of each panel 41 of the invention 40 is determined by the geometric characteristics of the vehicle 30, the operational requirements of the vehicle 30 and the maintenance requirements of the vehicle 30. The type, size and structure of the attachment/actuation hardware 47 of the invention are determined by the geometric characteristics of the vehicle 30, the operational requirements of the vehicle 30 and the maintenance requirements of the vehicle 30.

The subject invention 40, comprised of components 41, 47 provides aerodynamic drag reduction for all free stream flow 100 conditions including crosswind conditions. Aerodynamic drag reduction occurs when vehicle side surface 32, 33 boundary layer portion of the flow 100 is separated from the free stream portion of the flow 100 at the leading edge of the panels 41 and the boundary layer flow is directed into the base wake region while the high velocity free stream flow continues to flow streamwise along the outer surface of each panel 41. The free stream portion of the flow 100 leaving each panel 41 trailing edge trailing edge turns into the base area region forming a virtual boattail structure. The effectiveness of the subject invention to reduce drag and thereby increase fuel economy of a vehicle is determined by the panel 41 width W1, length L1, position X and Y, planform shape as shown in FIG. 12 and airfoil shape as shown in FIG. 13.

Figure 4:
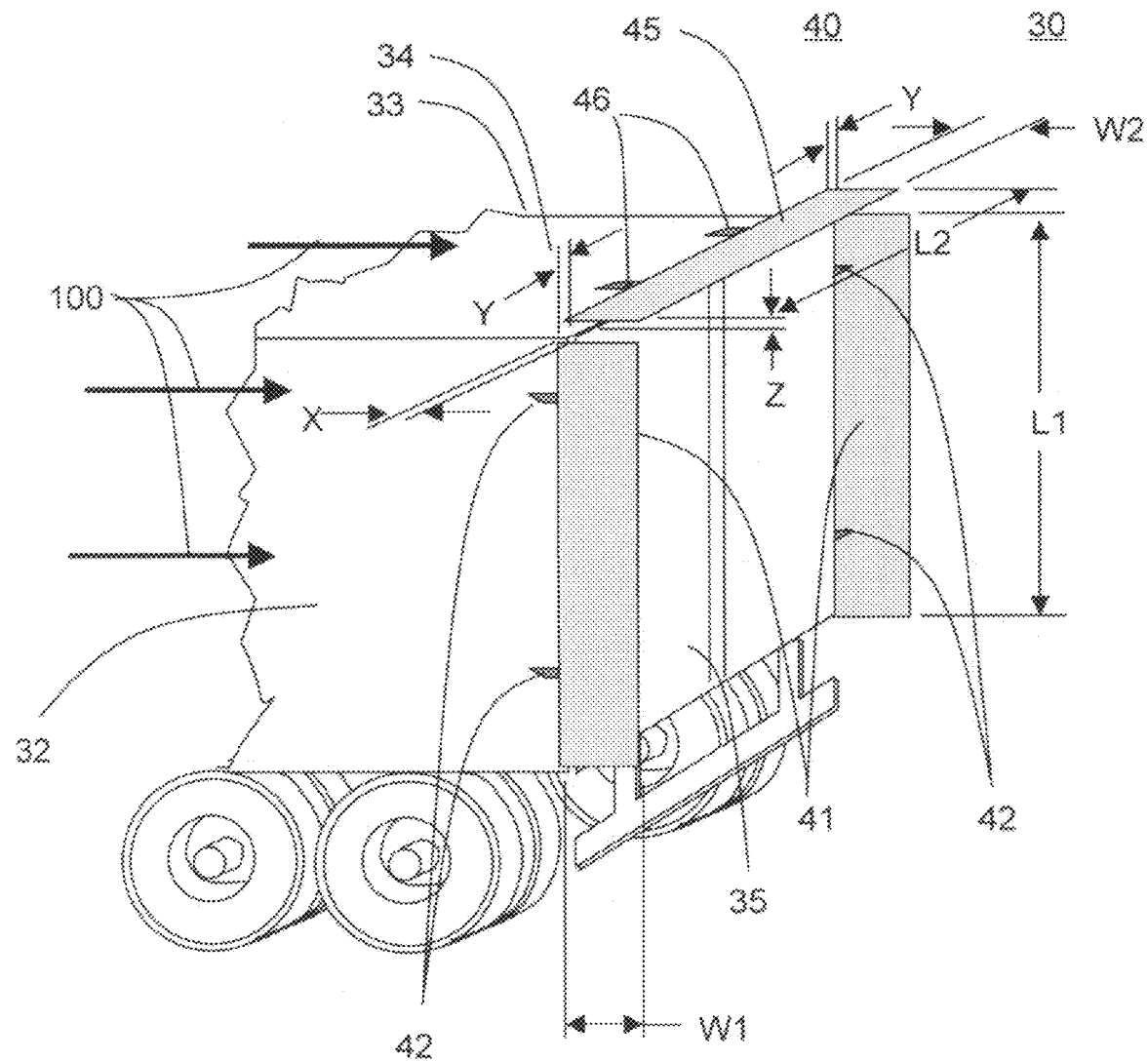
FIG. 4 is a rear perspective view of the aft most portion of a trailer of a tractor-trailer truck system with an alternate embodiment of a non-moveable version of the subject invention installed on the trailer.

FIG. 4 is a rear perspective view of the aft portion of a typical trailer 30 of a tractor-trailer truck with an alternate embodiment of the subject invention 40 installed on the trailer 30. The invention 40 is comprised of panels 41 and 45 and attachment hardware 42 and 46. The subject invention is comprised of panels 41 and 45 that are attached to vehicle 30. The side panels 41 are symmetrically positioned about the vehicle vertical plane of symmetry. Each side panel has a width W1 and a length L1 and is positioned laterally outboard from the vehicle side surfaces 32 and 33 a distance Y, where Y may be any value less than 25 percent of the vehicle width. The panel width W1 is less than the vehicle width. The top panel 45 has a width W2 and a length L2 and is positioned vertically above the vehicle upper surface 34 a distance Z, where Z may be any value less than 25 percent of the vehicle width. The panel width W2 is less than the vehicle width. Each panel is positioned longitudinally such that the leading edge of each panel 41 and 45 is in close proximity to the vehicle trailing edge. The longitudinal dimension X between the vehicle trailing edge and the leading edge of each panel 41 and 45 is less than 50 percent of the panel width W1 and W2 respectively. The length L1 of each panel 41 of the invention 40 is equivalent to the full vertical height of the vehicle base 30. The length L2 of panel 45 of the invention 40 is equivalent to the full width of the vehicle base 30. The width W1 of each panel 41 and the width W2 of panel 45 of the invention 40 are determined by the geometric characteristics of the vehicle 30, the operational requirements of the vehicle 30 and the maintenance requirements of the vehicle 30. The type, size and structure of the attachment/actuation hardware 42 and 46 of the invention are determined by the geometric characteristics of the vehicle 30, the operational requirements of the vehicle 30 and the maintenance requirements of the vehicle 30.

The subject invention 40, comprised of components 41, 42, 45, 46 provides aerodynamic drag reduction for all free stream flow 100 conditions including crosswind conditions. Aerodynamic drag reduction occurs when vehicle top surface 34 and side surface 32, 33 boundary layer portion of the flow 100 is separated from the free stream portion of the flow 100 at the leading edge of panels 41 and 45 and the boundary layer flow is directed into the base wake region while the high velocity free stream flow continues to flow streamwise along the outer surface of panels 41 and 45. The free stream portion of the flow 100 leaving panels 41 and 45 trailing edge turns into the base area region forming a virtual boattail structure. The effectiveness of the subject invention to reduce drag and thereby increase fuel economy of a vehicle is determined by the panels 41 and 45 width W1, width W2, length L1, length L2, position X, Y, Z, and planform shape as shown in FIG. 11 and airfoil shape as shown in FIG. 12.

Figure 5A:
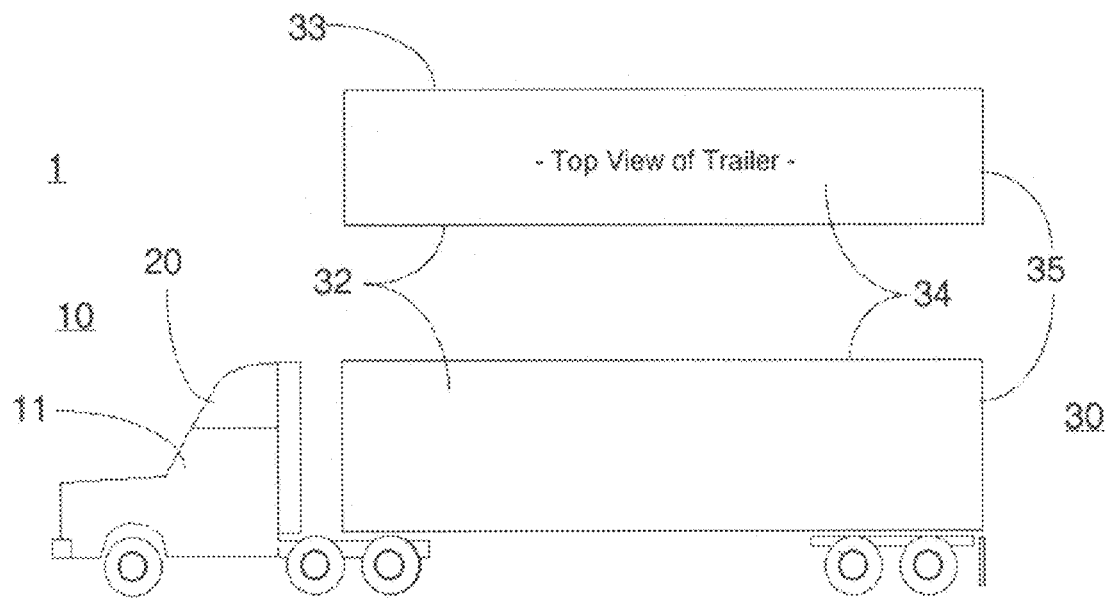
FIG. 5a to 5d are side and top views of various ground vehicles with and without the subject invention installed on the vehicles.
Figure 5B:
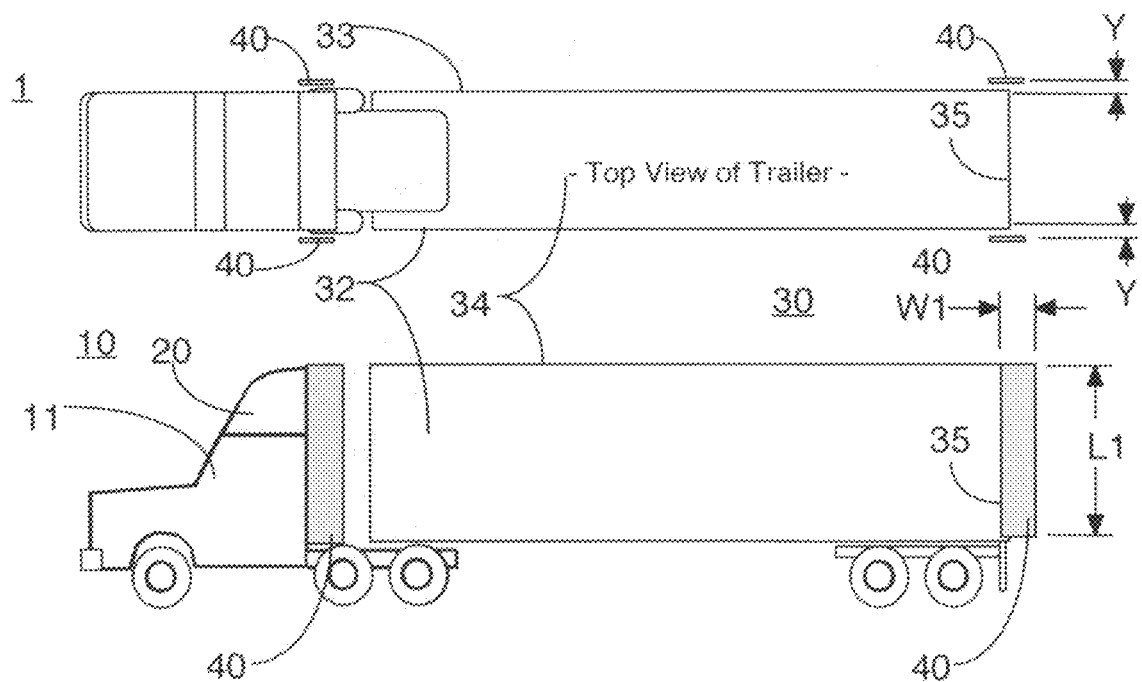
Figure 5C:
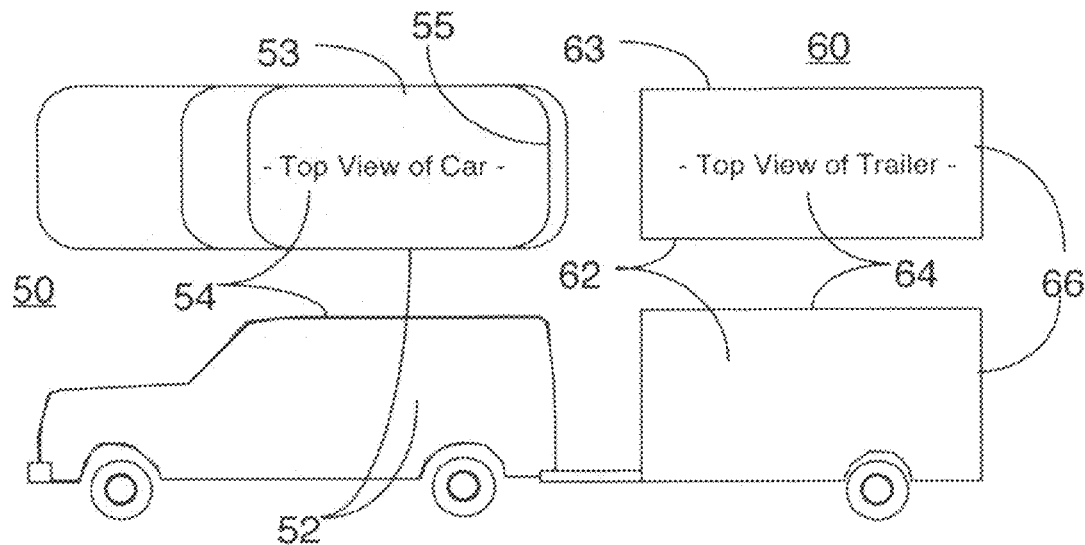
Figure 5D:
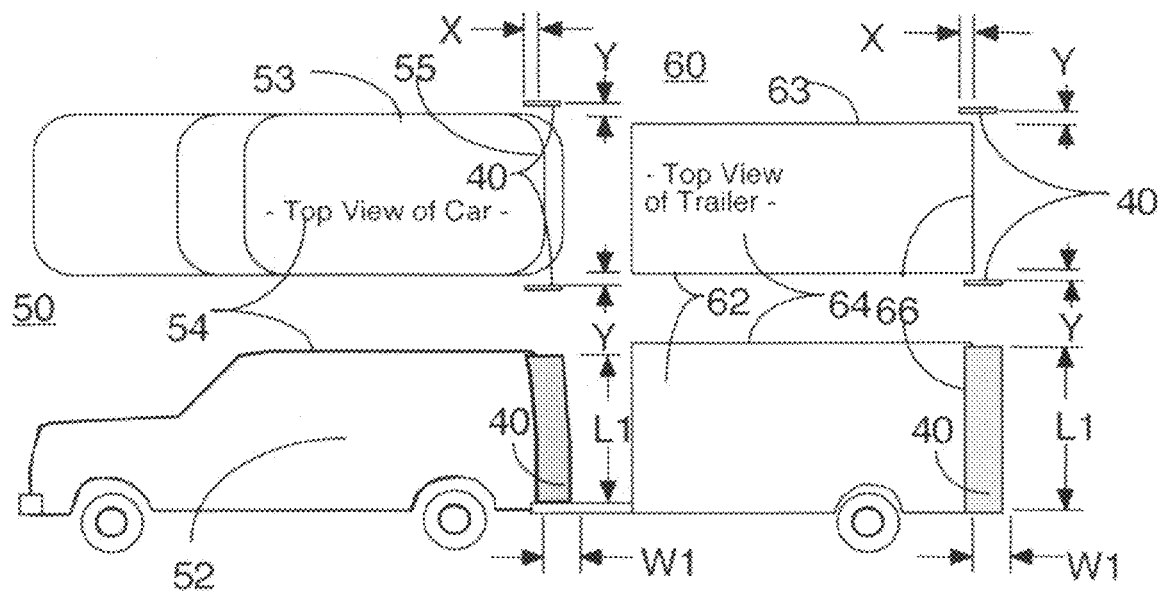

FIG. 5a through FIG. 5d are side and top views of example ground vehicles with and without the subject invention installed. FIG. 5a shows a typical tractor-trailer truck system 1, comprised of a powered tractor 10 that pulls a trailer 30. The tractor 10 is comprised of a cab 11 and an aerodynamic fairing system 20 that may be an integral part of the tractor 10. FIG. 5b shows the same tractor-trailer truck system 1 as that of FIG. 5a with the subject invention 40 installed on the tractor 10 and trailer 30. The panels that comprise the invention 40 are symmetrically positioned about the centerline of the trailer 30. FIG. 5c and FIG. 5d show an automobile 50 pulling a trailer 60 with and without the subject invention 40 installed on both the automobile 50 and trailer 60. The various vehicles depicted in FIG. 5 shows a powered vehicle towing/ pulling an un-powered towed vehicle. Additionally, other multiple component vehicles may be considered than those depicted.

Figure 6A:
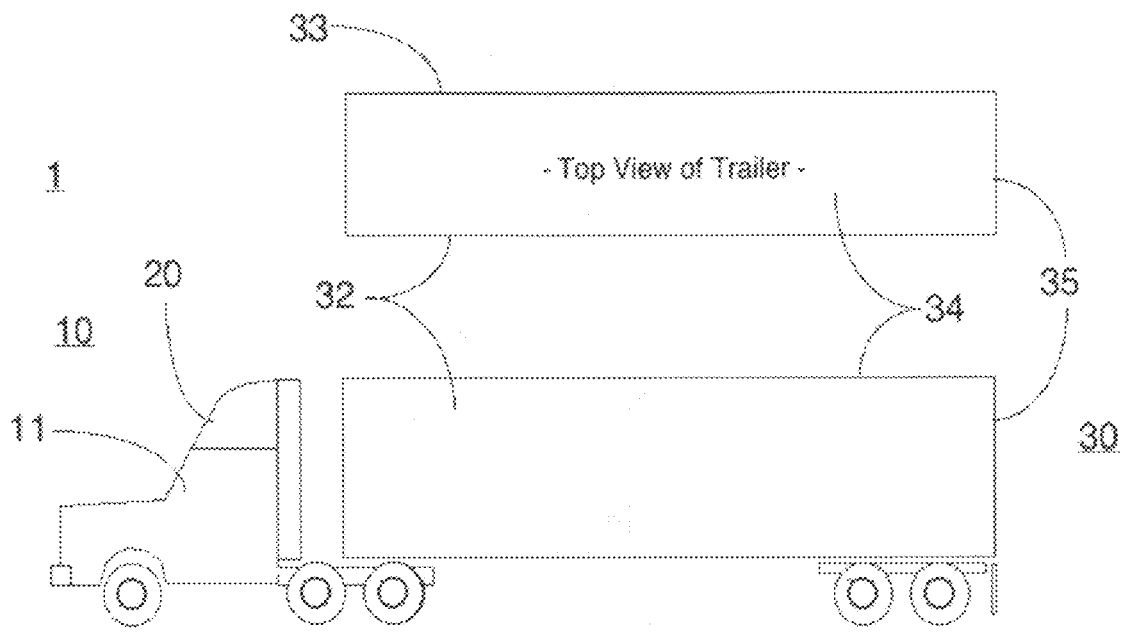
FIG. 6a to 6d are side and top views of various ground vehicles with and without an alternate embodiment of the subject invention installed on the vehicles.
Figure 6B:
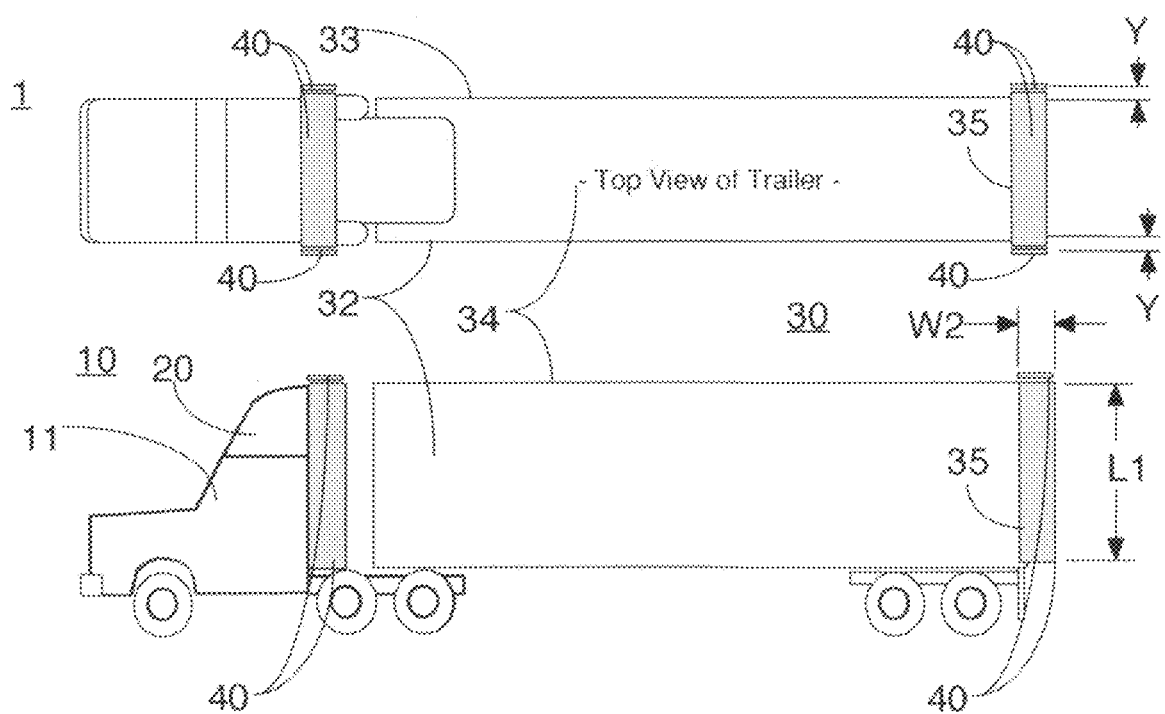
Figure 6C:
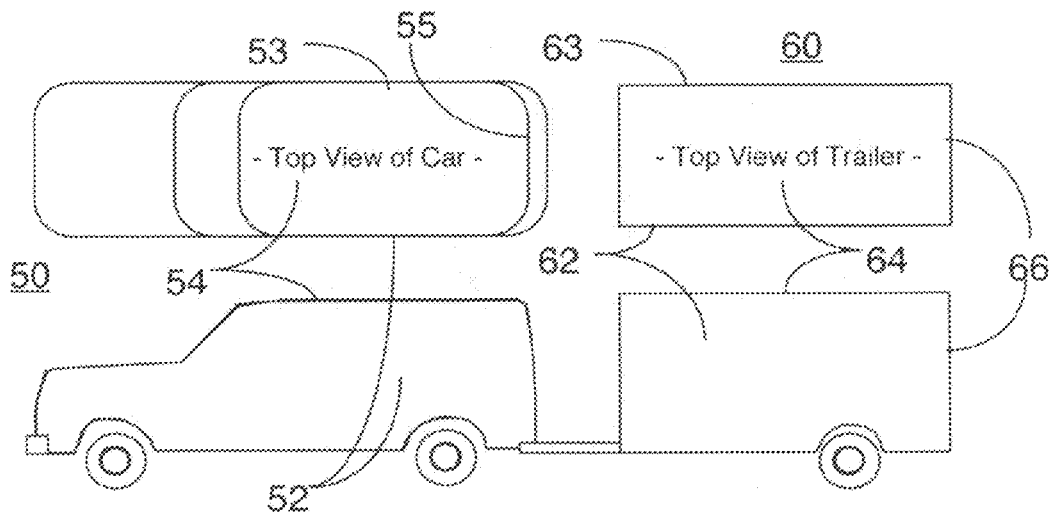
Figure 6D:
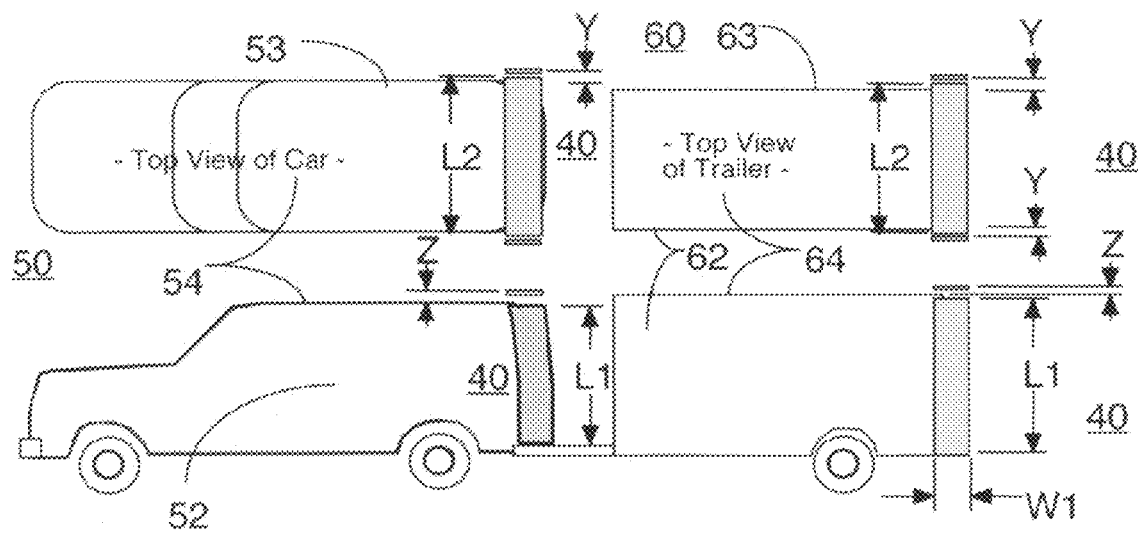

FIG. 6a through FIG. 6d are side and top views of example ground vehicles with and without an alternate embodiment of the subject invention installed. FIG. 6a shows a typical tractor-trailer truck system 1, comprised of a powered tractor 10 that pulls a trailer 30. The tractor 10 is comprised of a cab 11 and an aerodynamic fairing system 20 that may be an integral part of the tractor 10. FIG. 6b shows the same tractor-trailer truck system 1 as that of FIG. 6a with the subject invention 40 installed on the tractor 10 and the trailer 30. The panels 41 and 45 that comprise the invention 40 are symmetrically positioned about the centerline of the tractor 10 and trailer 30. FIG. 6c and FIG. 6d show an automobile 50 pulling a trailer 60 with and without the subject invention 40 installed on both the automobile 50 and the trailer 60. The various vehicles depicted in FIG. 6 shows a powered vehicle towing/pulling an un-powered towed vehicle. Additionally, other multiple component vehicles may be considered than those depicted.

Figure 7A:
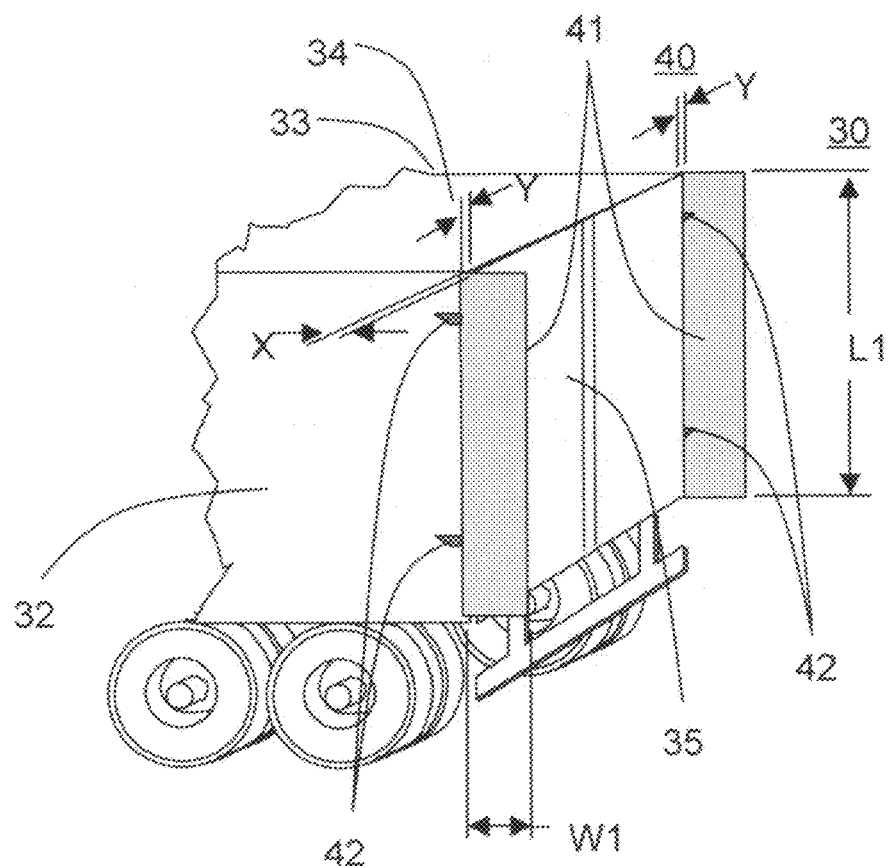
FIG. 7a to 7c is a perspective view and horizontal cross section view of a non-movable version of the subject invention installed on the trailer with various base geometries and doors.
Figure 7A:
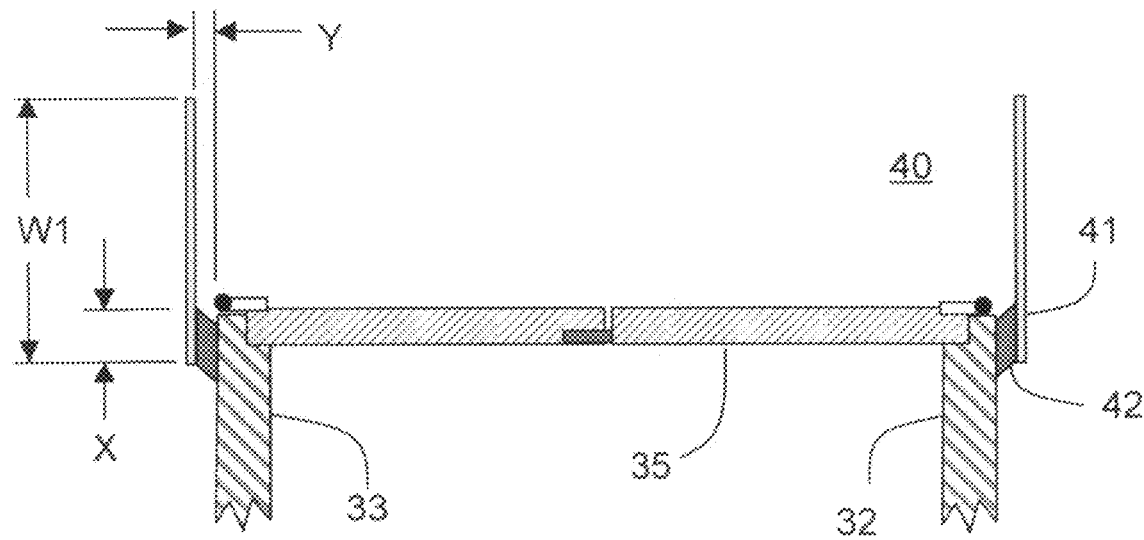
Figure 7B:
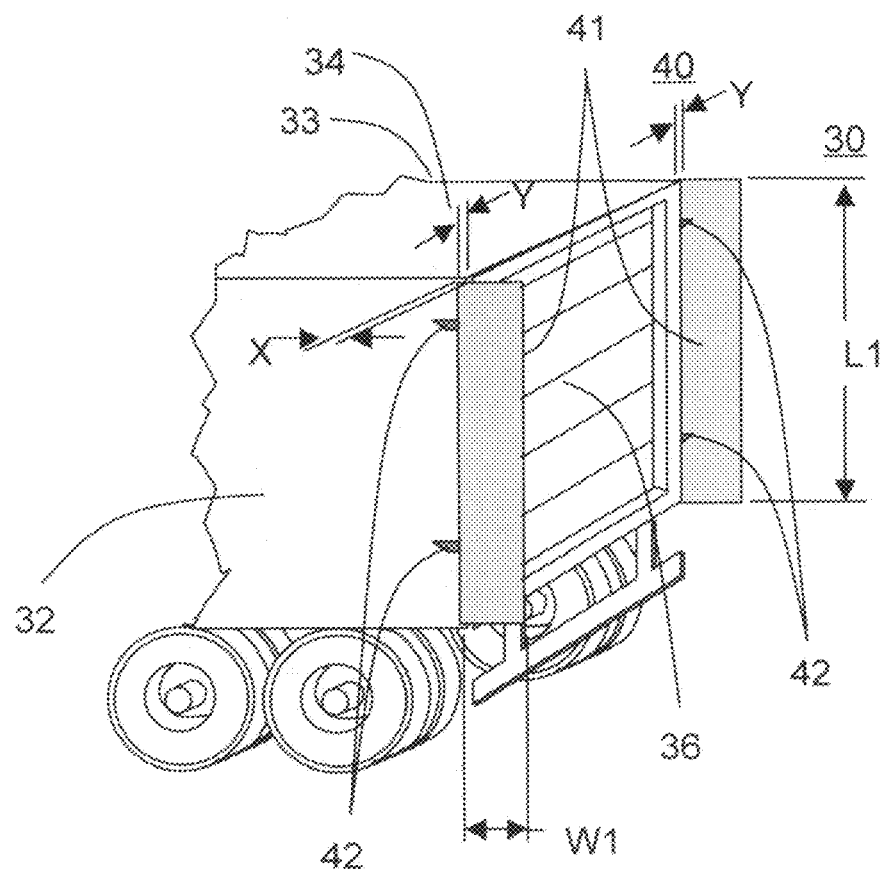
Figure 7B:
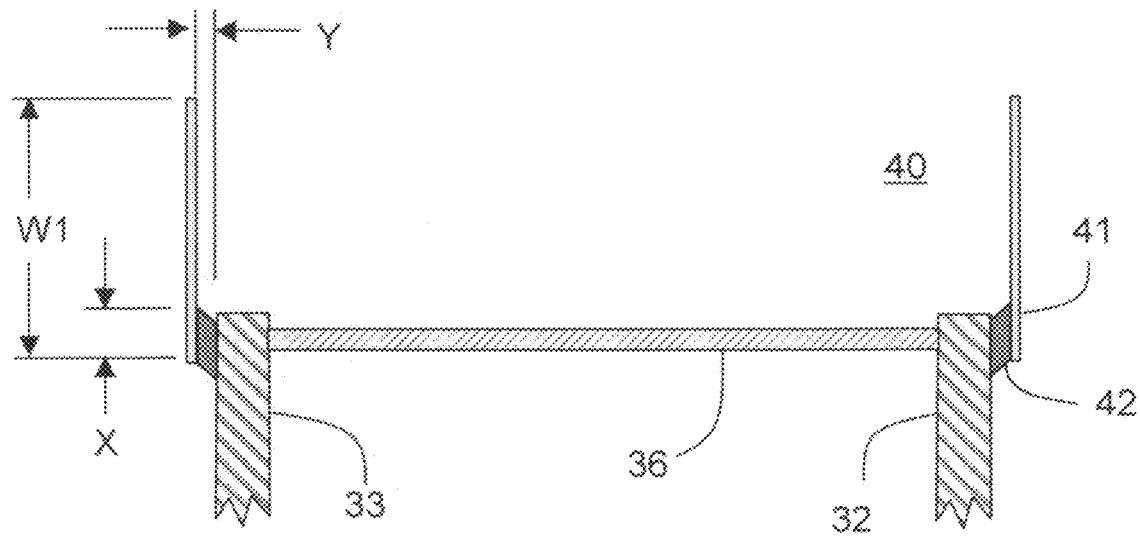
Figure 7C:
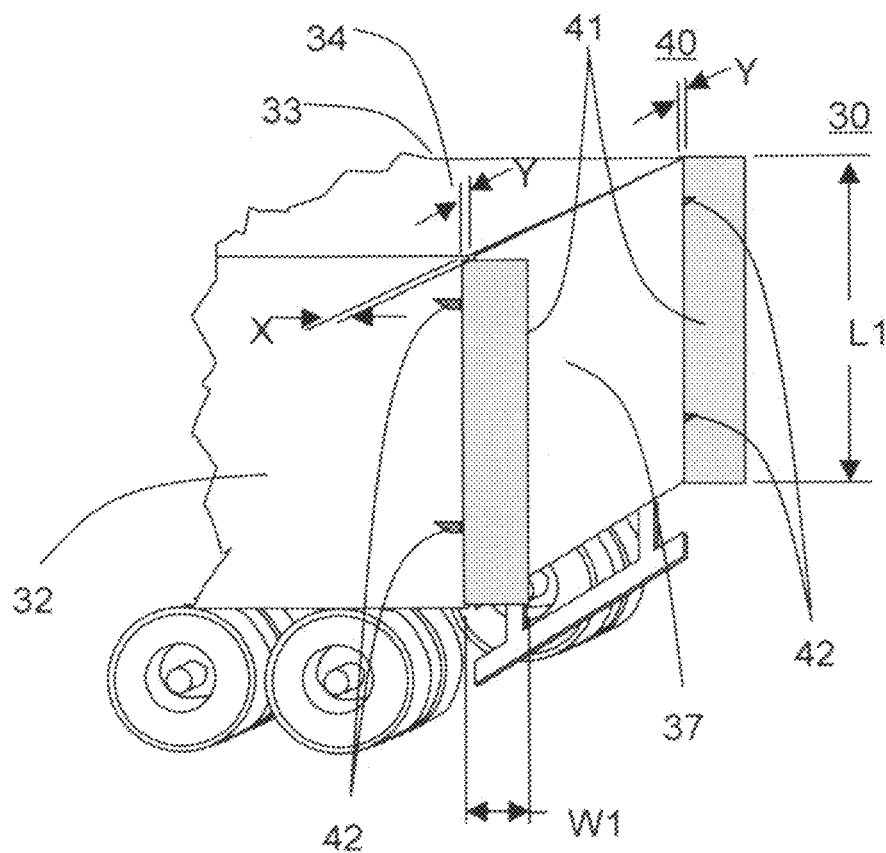
Figure 7C:
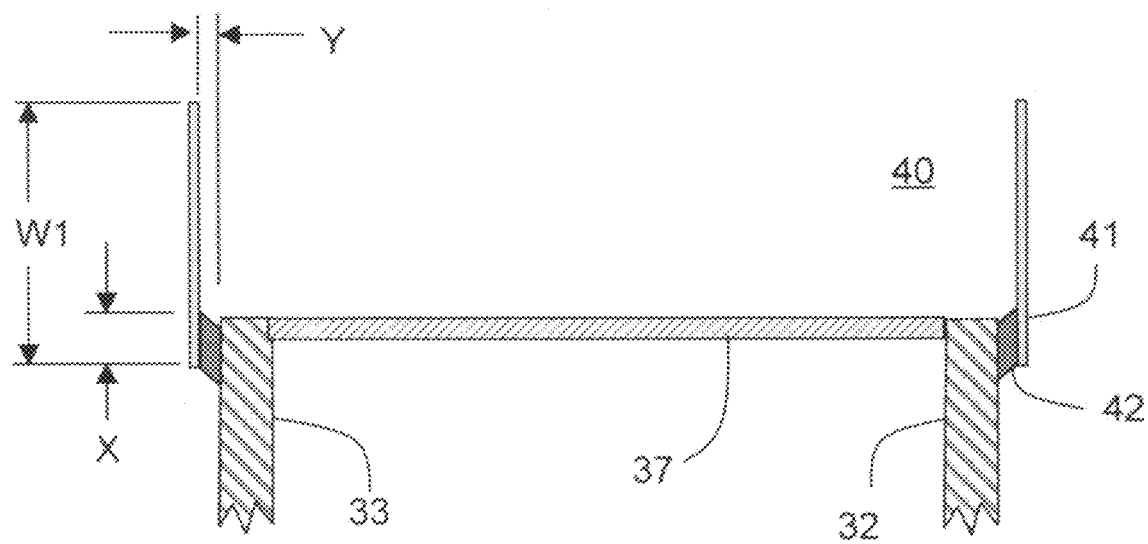

FIG. 7a through FIG. 7c shows a rear perspective view and a horizontal section cut of the aft portion of a trailer 30 of a tractor-trailer truck configured with a non-movable version of the subject invention 40 installed on the trailer 30. Shown in FIG. 7a is a typical swing door trailer 30 of a tractor-trailer truck with the subject invention 40 installed on the trailer 30. The subject invention 40 attaches to the trailer 30 by means of attachment hardware 42. The panel 41 has width W1 and length L1. The panel 41 is laterally offset from the side surface 32, 33 a distance Y and the panel leading edge is positioned in close proximity to the vehicle side surface 32, 33 trailing edge at a distance X.

Shown in FIG. 7b is a typical roll up door trailer 30 of a tractor-trailer truck with the subject invention 40 installed on the trailer 30. The subject invention 40 attaches to the trailer 30 by means of attachment hardware 42. The panel 41 has width W1 and length L1. The panel 41 is laterally offset from the side surface 32, 33 a distance Y and the panel leading edge is positioned in close proximity to the vehicle side surface 32, 33 trailing edge at a distance X.

Shown in FIG. 7c is a typical trailer 30 without a rear door of a tractor-trailer truck with the subject invention 40 installed on the trailer 30. The subject invention 40 attaches to the trailer 30 by means of attachment hardware 42. The panel 41 has width W1 and length L1. The panel 41 is laterally offset from the side surface 32, 33 a distance Y and the panel leading edge is positioned in close proximity to the vehicle side surface 32, 33 trailing edge at a distance X.

Figure 8A:
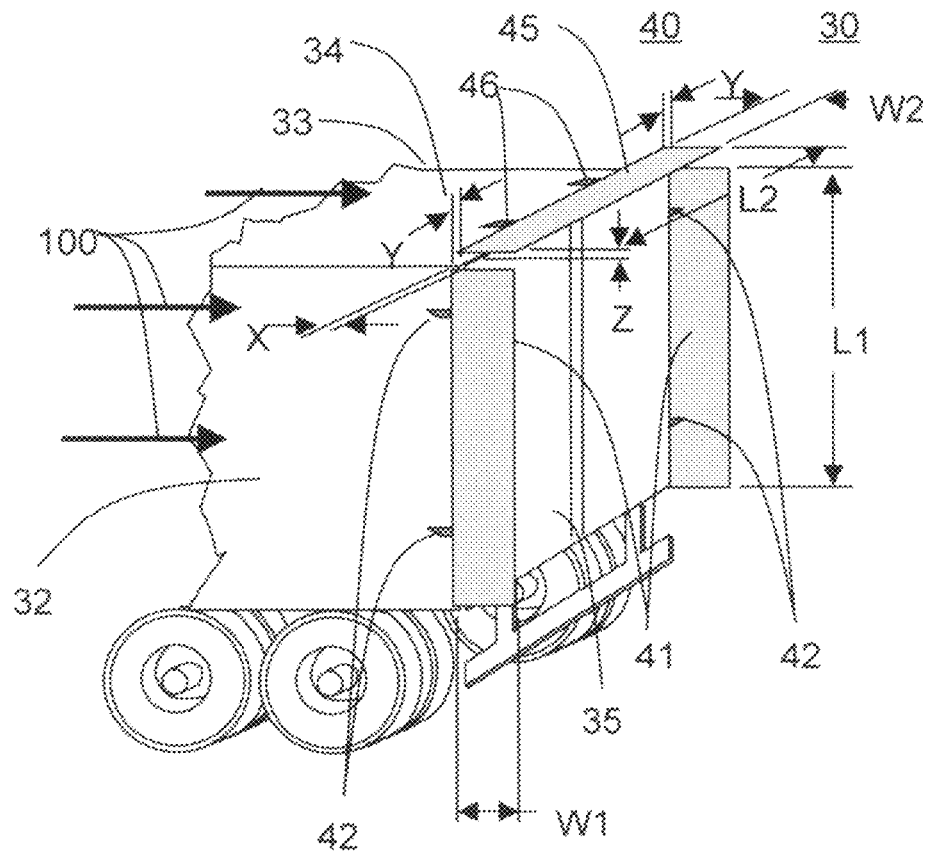
FIG. 8a to 8c is a perspective view and vertical cross section view of an alternate embodiment of a non-movable version of the subject invention installed on the trailer with various base geometries and doors.
Figure 8A:
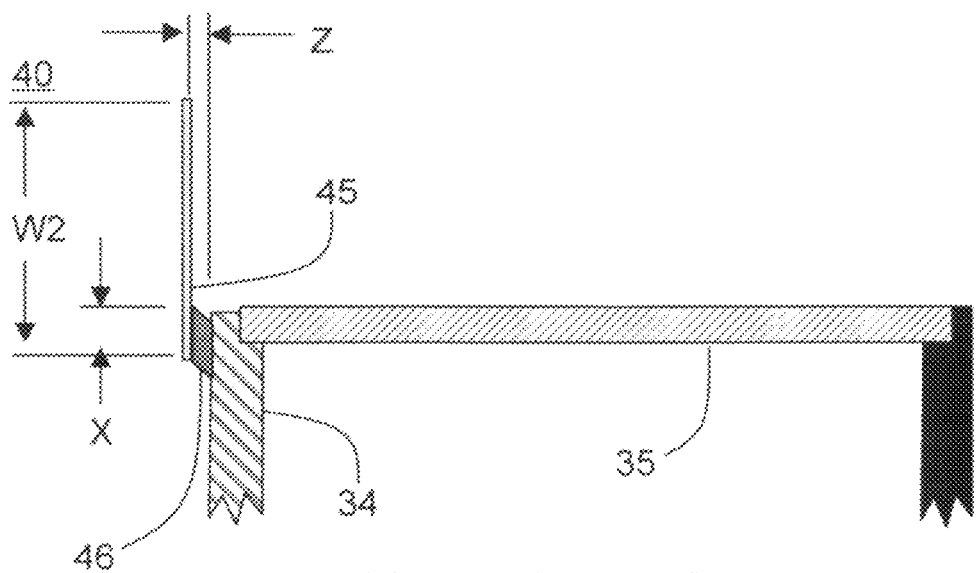
Figure 8B:
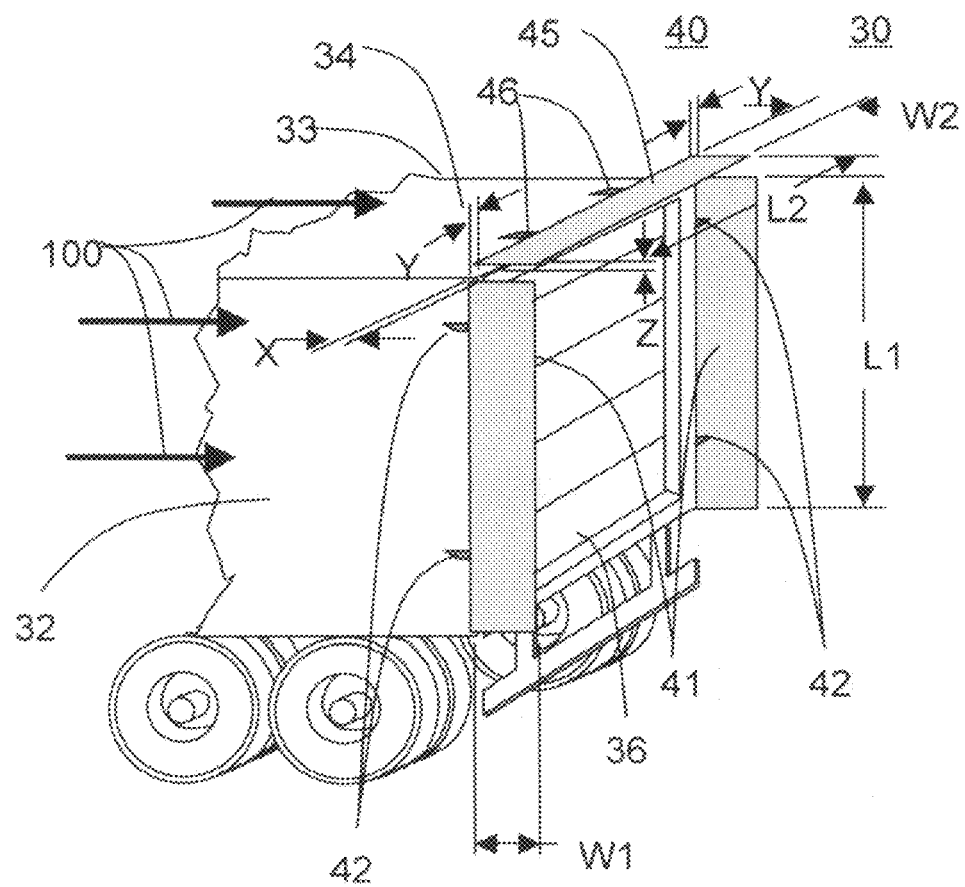
Figure 8B:
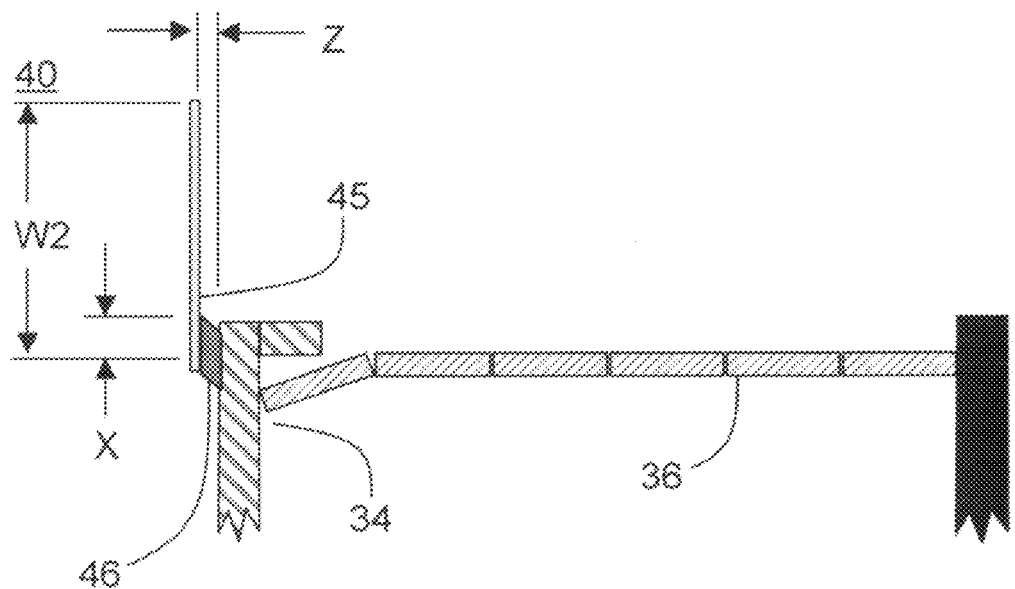
Figure 8C:
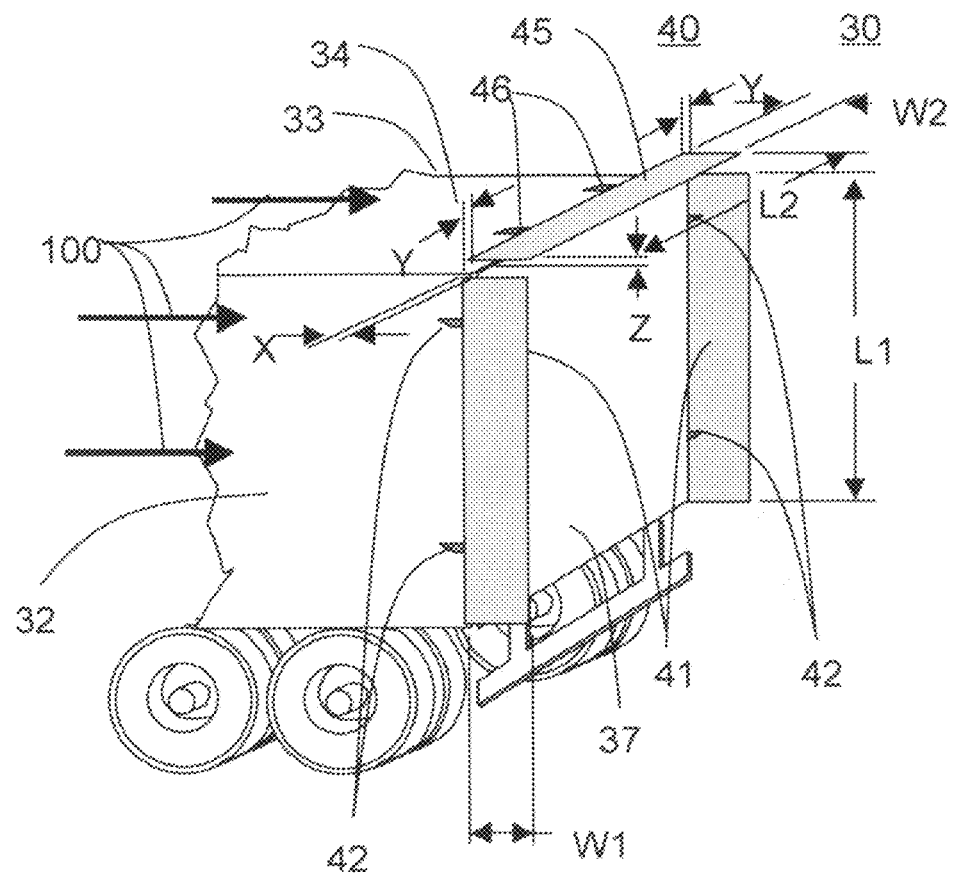
Figure 8C:
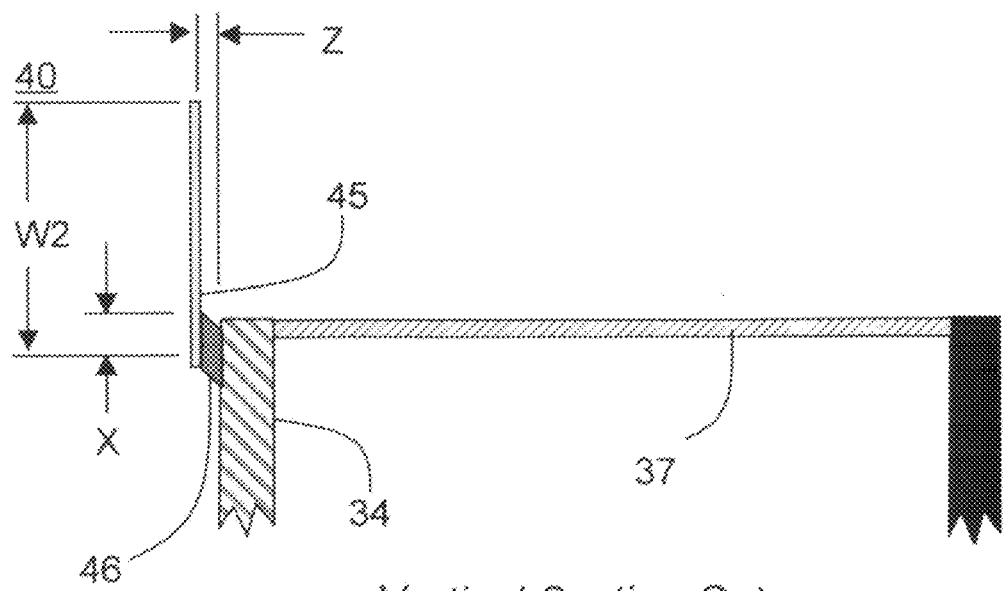

FIG. 8a through FIG. 8c shows a rear perspective view and a vertical section cut of the aft portion of a trailer 30 of a tractor-trailer truck configured with an alternate embodiment non-movable version of the subject invention 40 installed on the trailer 30. Shown in FIG. 8a is a typical swing door trailer 30 of a tractor-trailer truck with the subject invention 40 installed on the trailer 30. The subject panels 41 and 45 of the invention 40 attach to the trailer 30 by means of attachment hardware 42 and 46. The side panels 41 have width W1 and length L1. The top panel 45 has width W2 and length L2. The panel 41 is laterally offset from the side surface 32, 33 a distance Y and the panel 45 is vertically offset from the top surface 34 a distance Z and the leading edges of panels 41 and 45 are positioned in close proximity to the vehicle side surface 32 and 33 and top surface 34 trailing edge at a distance X.

Shown in FIG. 8b is a typical roll up door trailer 30 of a tractor-trailer truck with the subject invention 40 installed on the side surface 32 and 33 and top surface 34 of a trailer 30. The subject panels 41 and 45 of the invention 40 attach to the trailer 30 by means of attachment hardware 42 and 46. The side panels 41 have width W1 and length L1. The top panel 45 has width W2 and length L2. The panel 41 is laterally offset from the side surface 32, 33 a distance Y and the panel 45 is vertically offset from the top surface 34 a distance Z and the leading edges of panels 41 and 45 are positioned in close proximity to the vehicle side surface 32, 33 and top surface 34 trailing edge at a distance X.

Shown in FIG. 8c is a typical trailer 30 without a rear door of a tractor-trailer truck with the subject invention 40 installed on the trailer 30. The subject panels 41 and 45 of the invention 40 attach to the trailer 30 by means of attachment hardware 42 and 46. The side panels 41 have width W1 and length L1. The top panel 45 has width W2 and length L2. The panel 41 is laterally offset from the side surface 32, 33 a distance Y and the panel 45 is vertically offset from the top surface 34 a distance Z and the leading edges of panels 41 and 45 are positioned in close proximity to the vehicle side surface 32, 33 and top surface 34 trailing edge at a distance X.

Figure 9A:
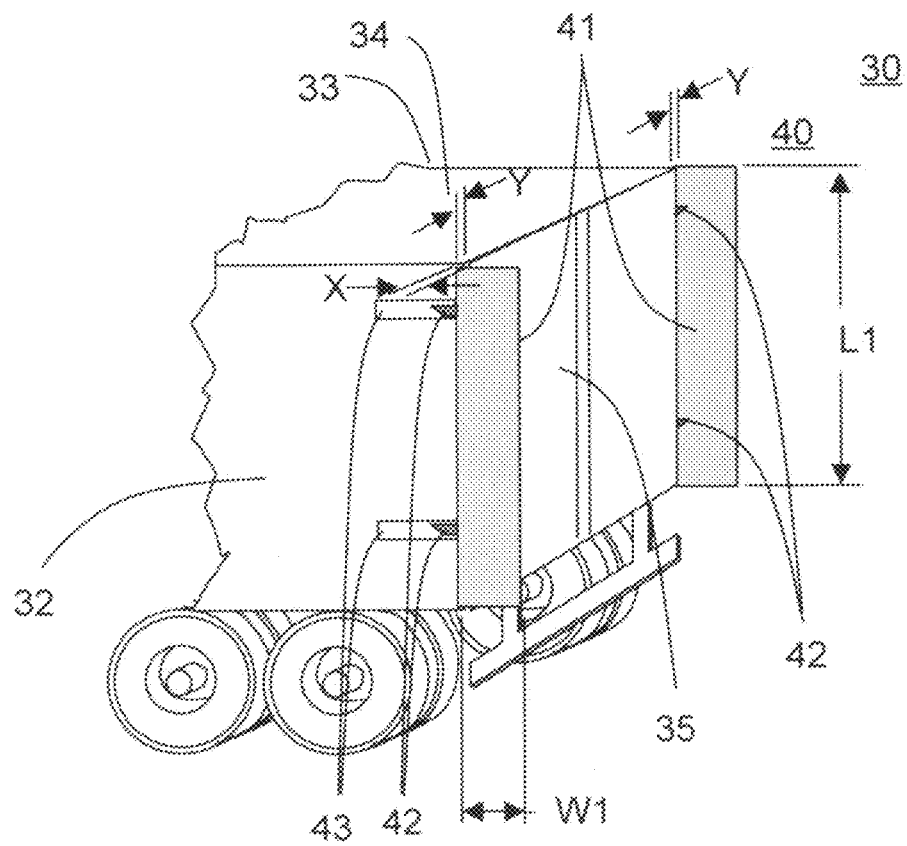
FIG. 9a is a perspective view and horizontal cross section view of a movable version of the subject invention installed on the trailer with swing doors.
Figure 9A:
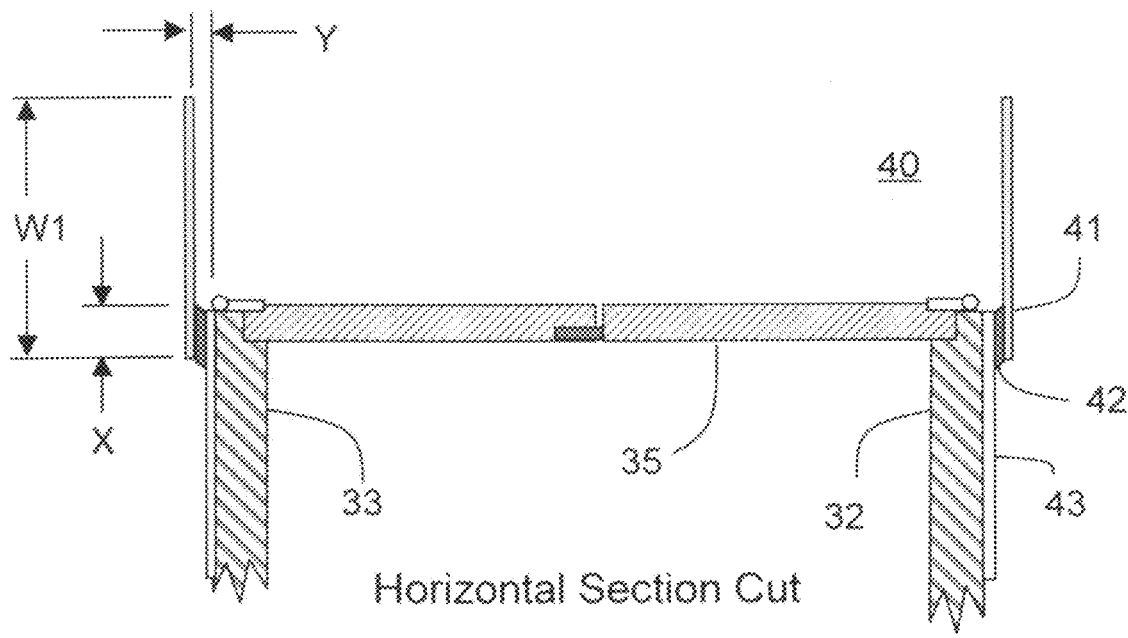

FIG. 9a through FIG. 9d shows a rear perspective view and details of the aft portion of a trailer 30 of a tractor-trailer truck configured with a movable version of the subject invention 40 installed on the trailer 30. Shown in FIG. 9a is a typical swing door trailer 30 of a tractor-trailer truck with the subject invention 40 installed on the trailer 30. The subject invention 40 attaches to the trailer 30 by means of attachment hardware 42 and actuation hardware 43. The panel 41 has width W1 and length L1. The panel 41 is laterally offset from the side surface 32, 33 a distance Y and the panel leading edge is positioned in close proximity to the vehicle side surface 32, 33 trailing edge at a distance X. The panel 41 attaches to the attachment hardware 42 that in turn attaches to the actuation hardware 43 that in turn attaches to the side surface 32 and 33 of the vehicle.

Figure 9B:
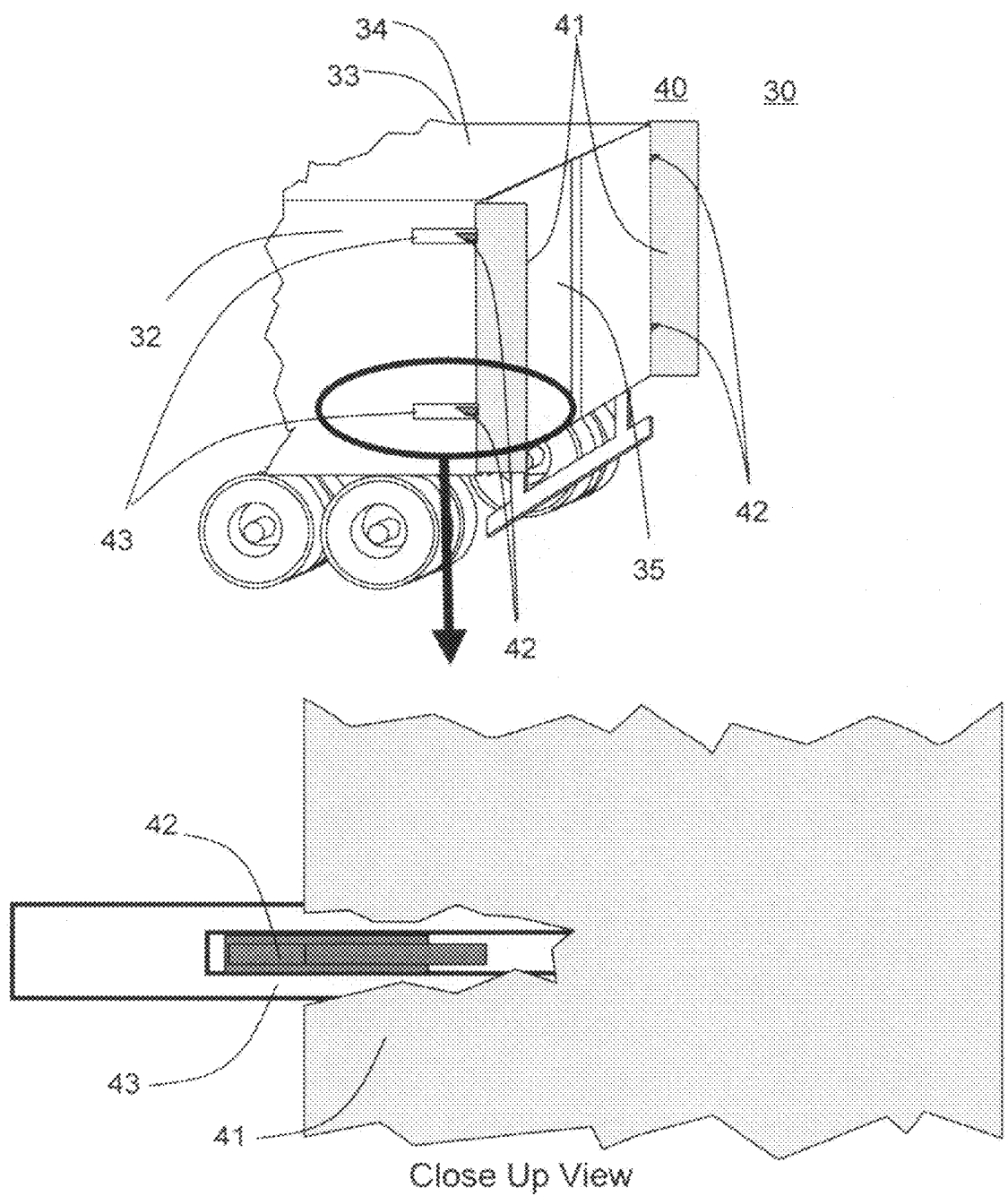
FIG. 9b is a perspective view and expanded view of a representative movement mechanism for the movable version of the subject invention installed on the trailer with swing doors.
Figure 9C:
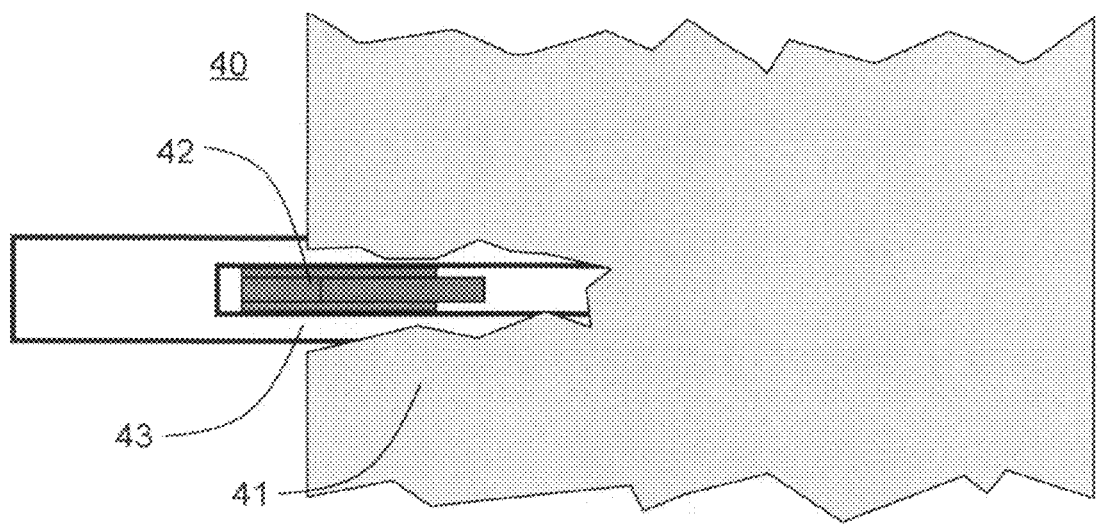
FIG. 9c details of a representative manually operated movement mechanism for the movable version of the subject invention installed on the trailer with swing doors.
Figure 9C:
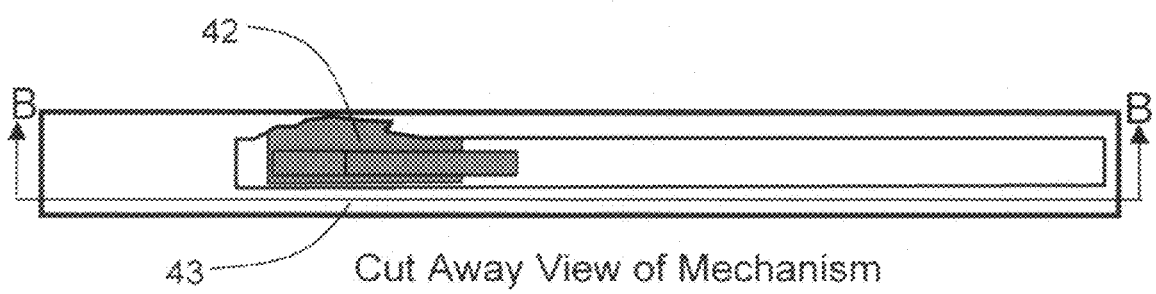
Figure 9C:
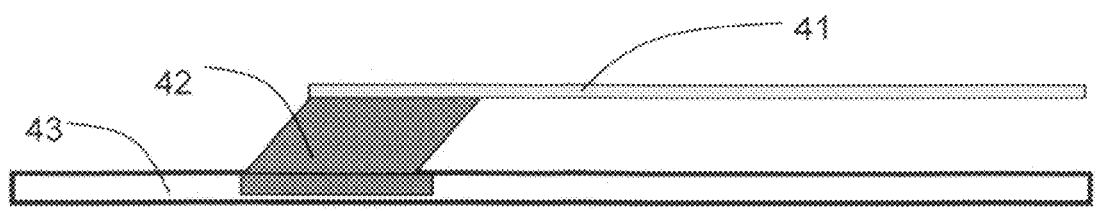
Figure 9D:
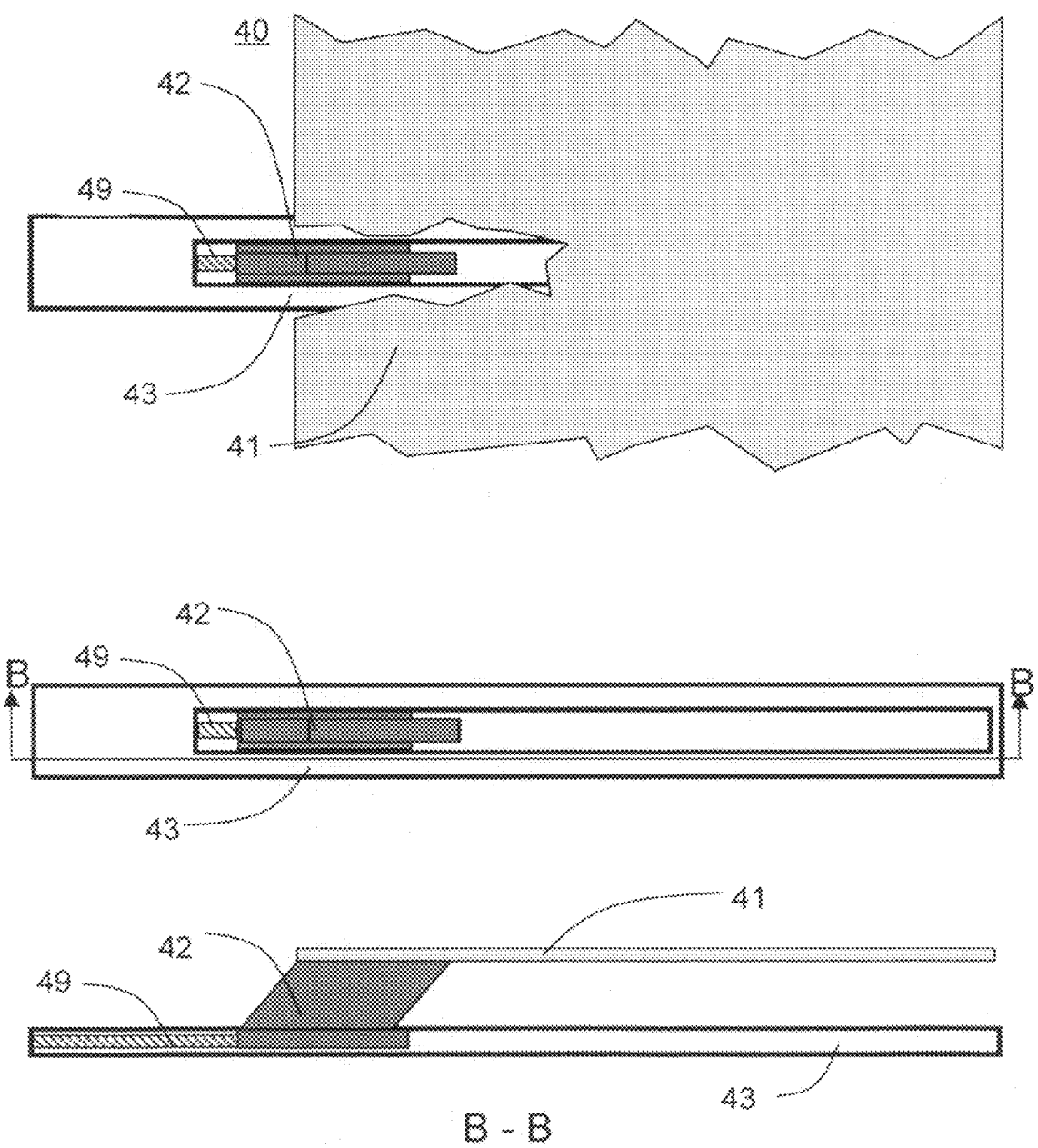
FIG. 9d details of a representative automated movement mechanism for the movable version of the subject invention installed on the trailer with swing doors.

Shown in FIG. 9b is a typical roll up door trailer 30 of a tractor-trailer truck with the subject invention 40 installed on the trailer 30. Also shown in FIG. 9b is an expanded view of one embodiment of attachment hardware 42 and actuation hardware 43. The subject invention 40 attaches to the trailer 30 by means of attachment hardware 42 and actuation hardware 43. The actuation hardware 43 represented in the figure is a sliding mechanism that may be manually operated or powered. FIG. 9c shows additional details of a typical manually operated sliding actuation hardware 43. FIG. 9d shows additional details of a typical powered sliding actuation hardware 43 that contains a drive mechanism 49 that would be connected to a power supply and sensor or switch device to activate the drive mechanism 49.

Figure 10A:
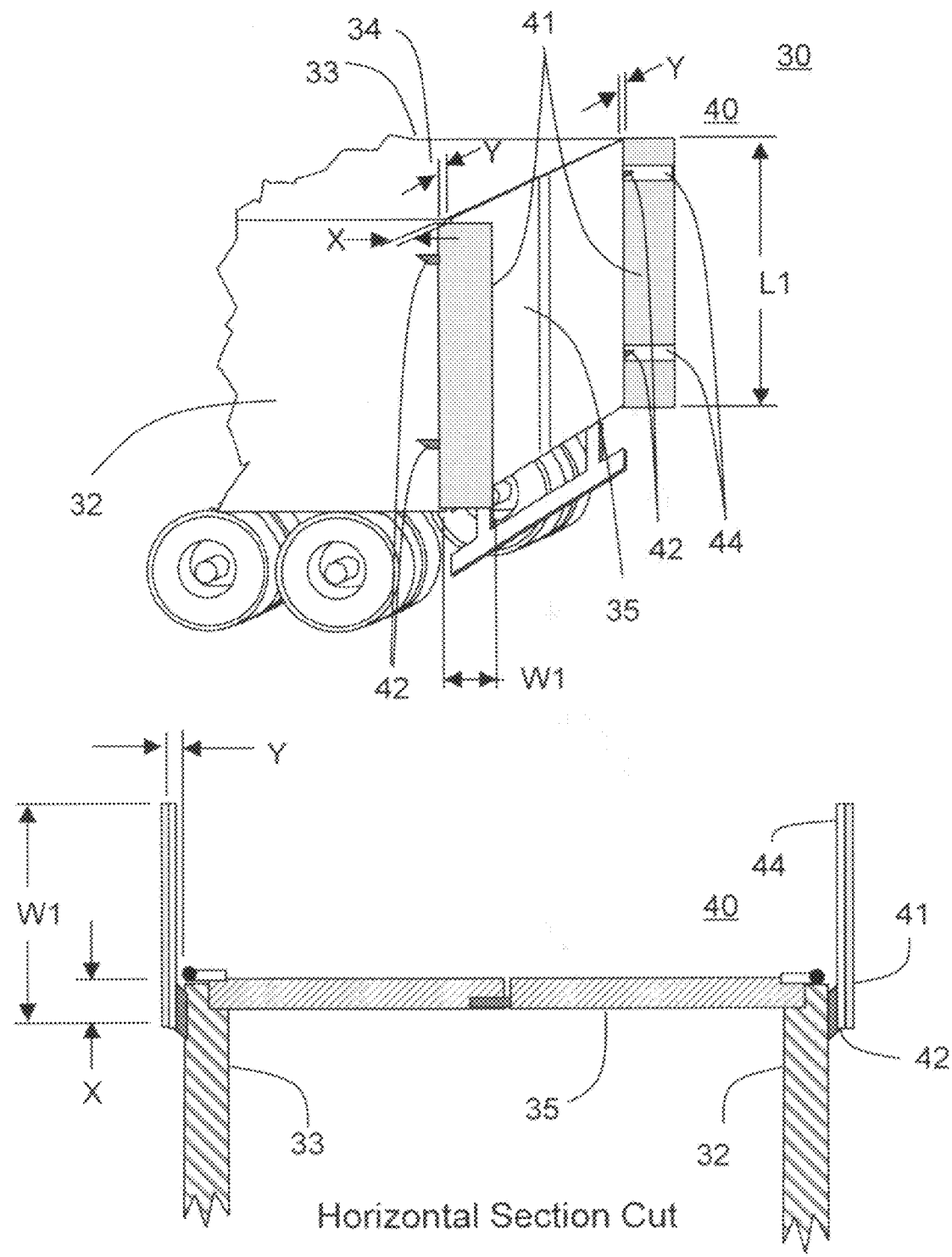
FIG. 10a is a perspective view and horizontal cross section view of the subject invention installed on the trailer with swing doors with a device mounted movement mechanism.
Figure 10B:
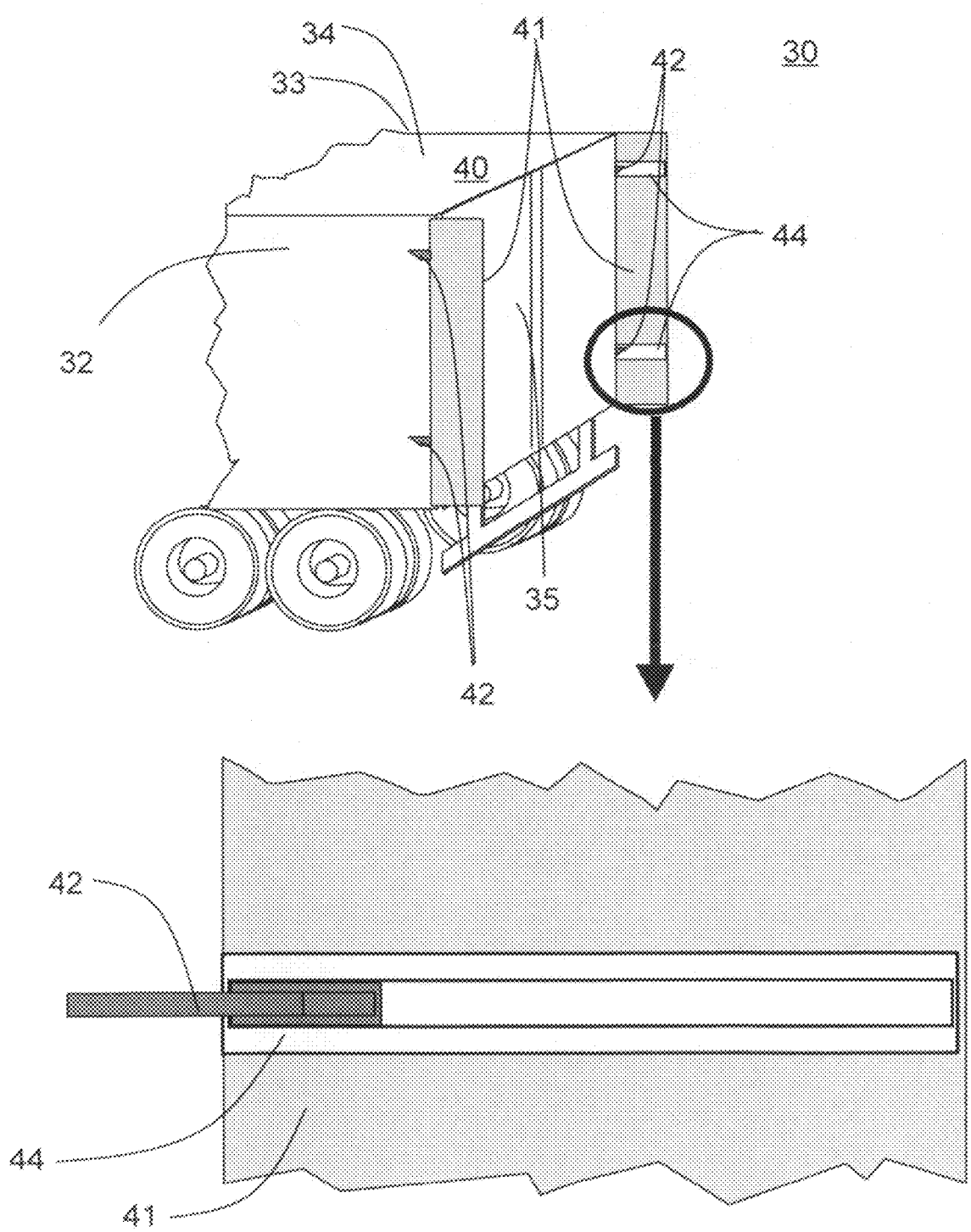
FIG. 10b is a perspective view and expanded view of a representative device mounted movement mechanism for the movable version of the subject invention installed on the trailer with swing doors.
Figure 10C:
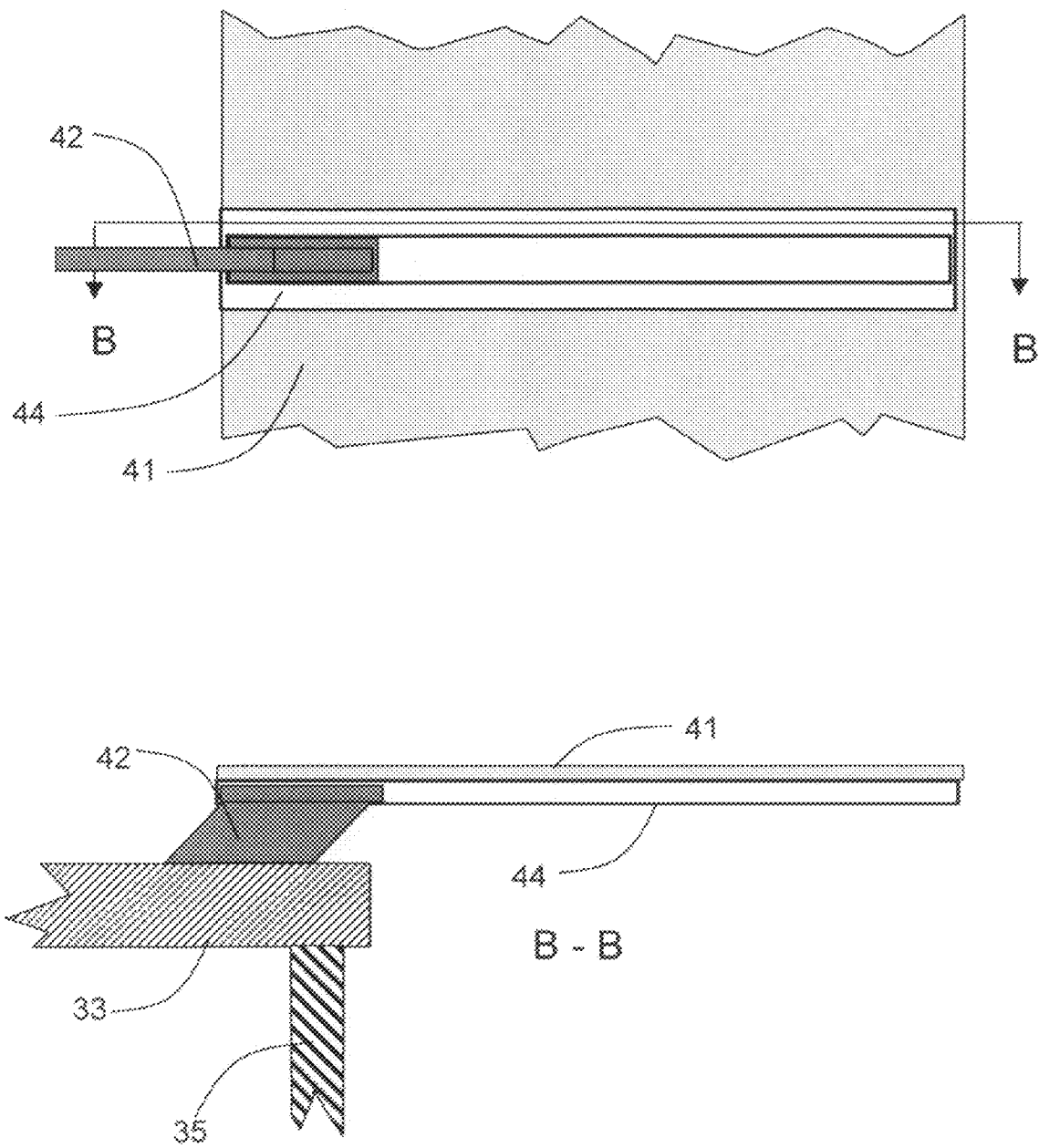
FIG. 10c details of the representative device mounted manually operated movement mechanism for the movable version of the subject invention installed on the trailer with swing doors.

FIG. 10a through FIG. 10c shows a rear perspective view and details of the aft portion of a trailer 30 of a tractor-trailer truck configured with a movable version of the subject invention 40 installed on the trailer 30. Shown in FIG. 10a is a typical swing door trailer 30 of a tractor-trailer truck with the subject invention 40 installed on the trailer 30. The subject invention 40 attaches to the trailer 30 by means of attachment hardware 42 and actuation hardware 44. The panel 41 has width W1 and length L1. The panel 41 is laterally offset from the side surface 32, 33 a distance Y and the panel leading edge is positioned in close proximity to the vehicle side surface 32 and 33 trailing edge at a distance X. The panel 41 attaches to the actuation hardware 44 that in turn attaches to the attachment hardware 43 that in turn attaches to the side surface 32 and 33 of the vehicle.

Shown in FIG. 10b is a typical swing door trailer 30 of a tractor-trailer truck with the subject invention 40 installed on the trailer 30. Also shown in FIG. 10b is an expanded view of one embodiment of attachment hardware 42 and actuation hardware 43. The subject invention 40 attaches to the trailer 30 by means of attachment hardware 42 and actuation hardware 44. The actuation hardware 44 represented in the figure is a sliding mechanism that may be manually operated or powered. FIG. 10c shows additional details of a typical sliding actuation hardware 44.

Figure 11A:
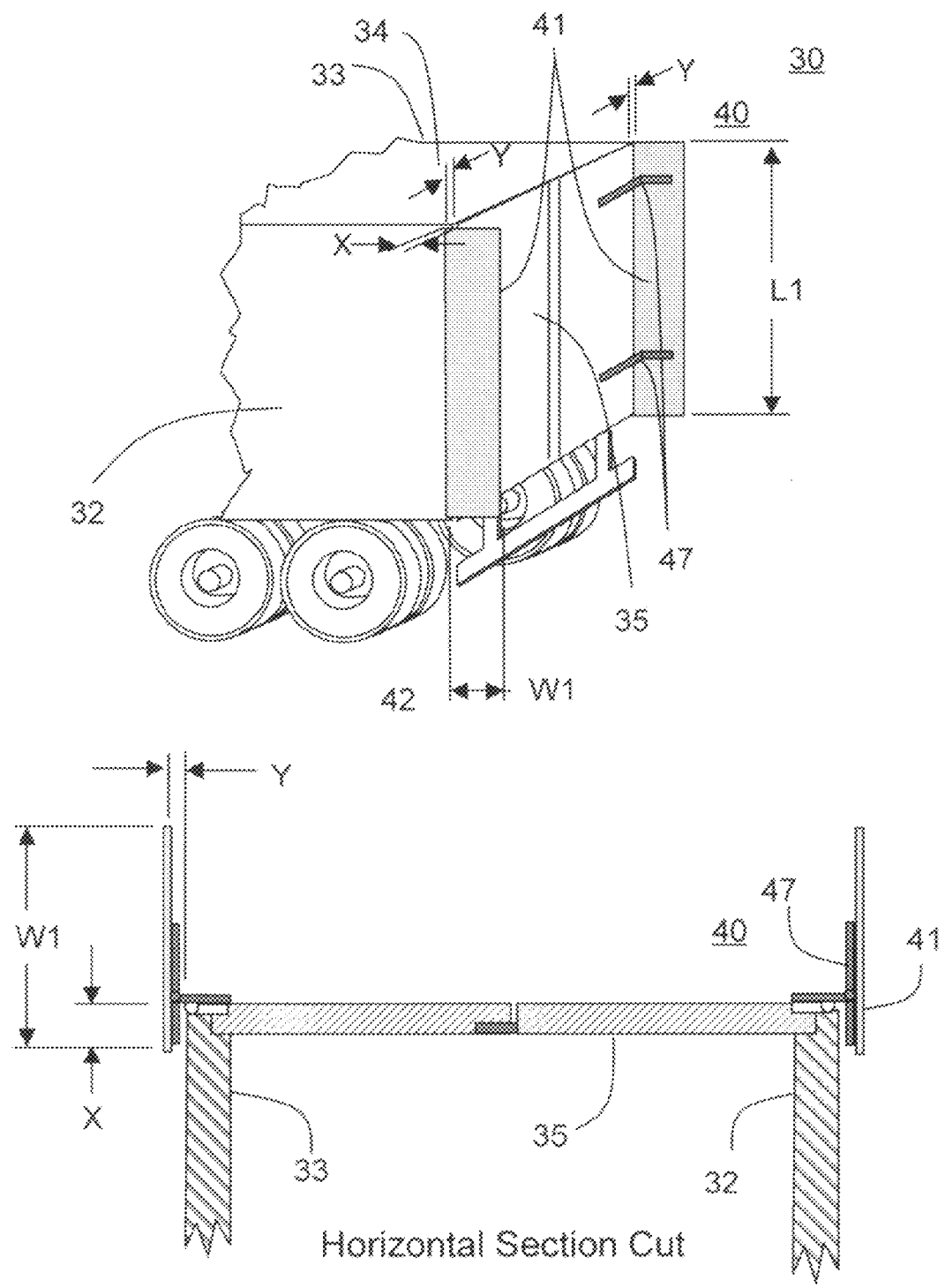
FIG. 11a is a perspective view and horizontal cross section view of the subject invention installed on the trailer with swing doors with a device mounted movement mechanism.
Figure 11B:
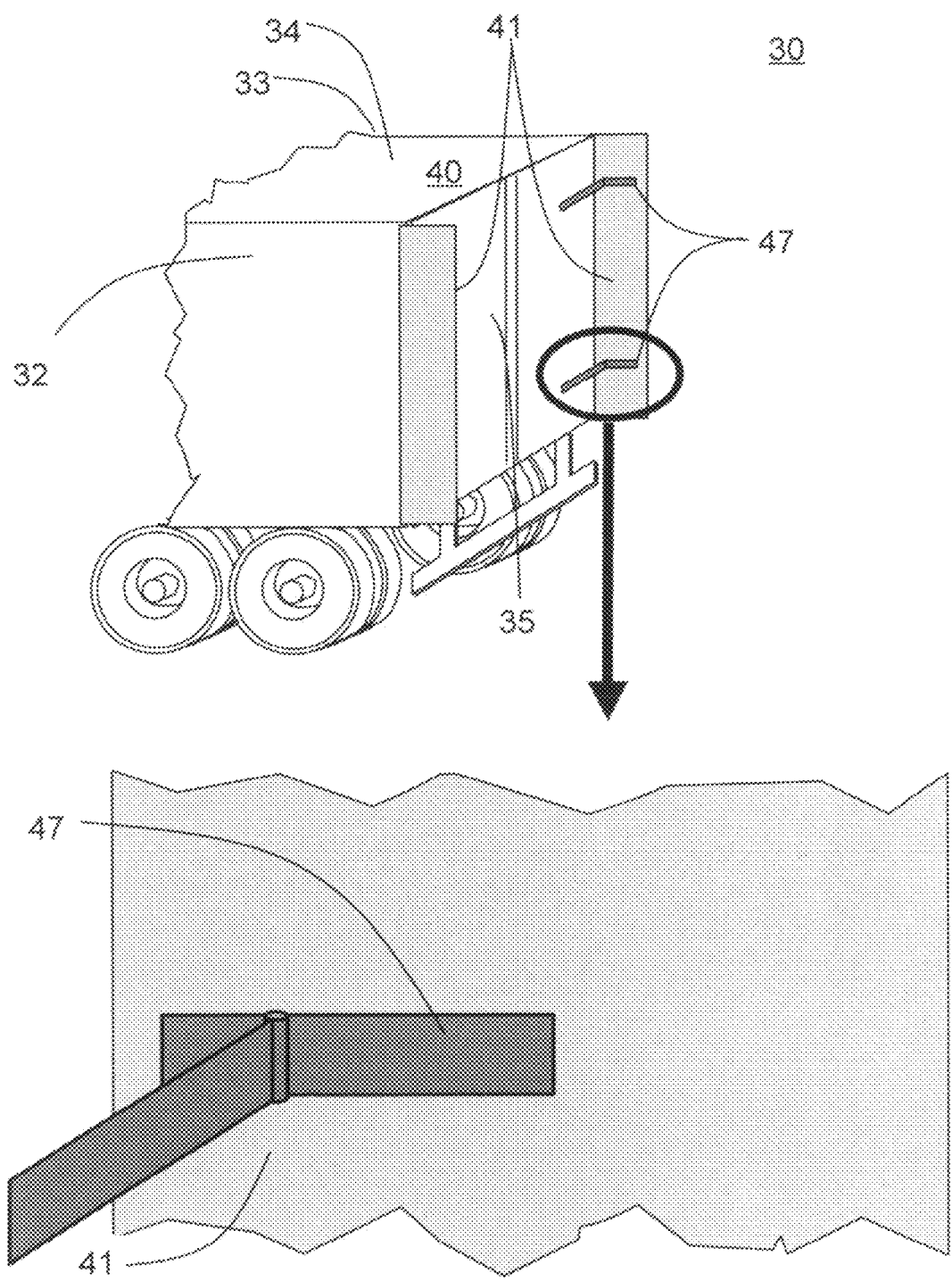
FIG. 11b is a perspective view and expanded view of a representative device mounted movement mechanism for the movable version of the subject invention installed on the trailer with swing doors.
Figure 11C:
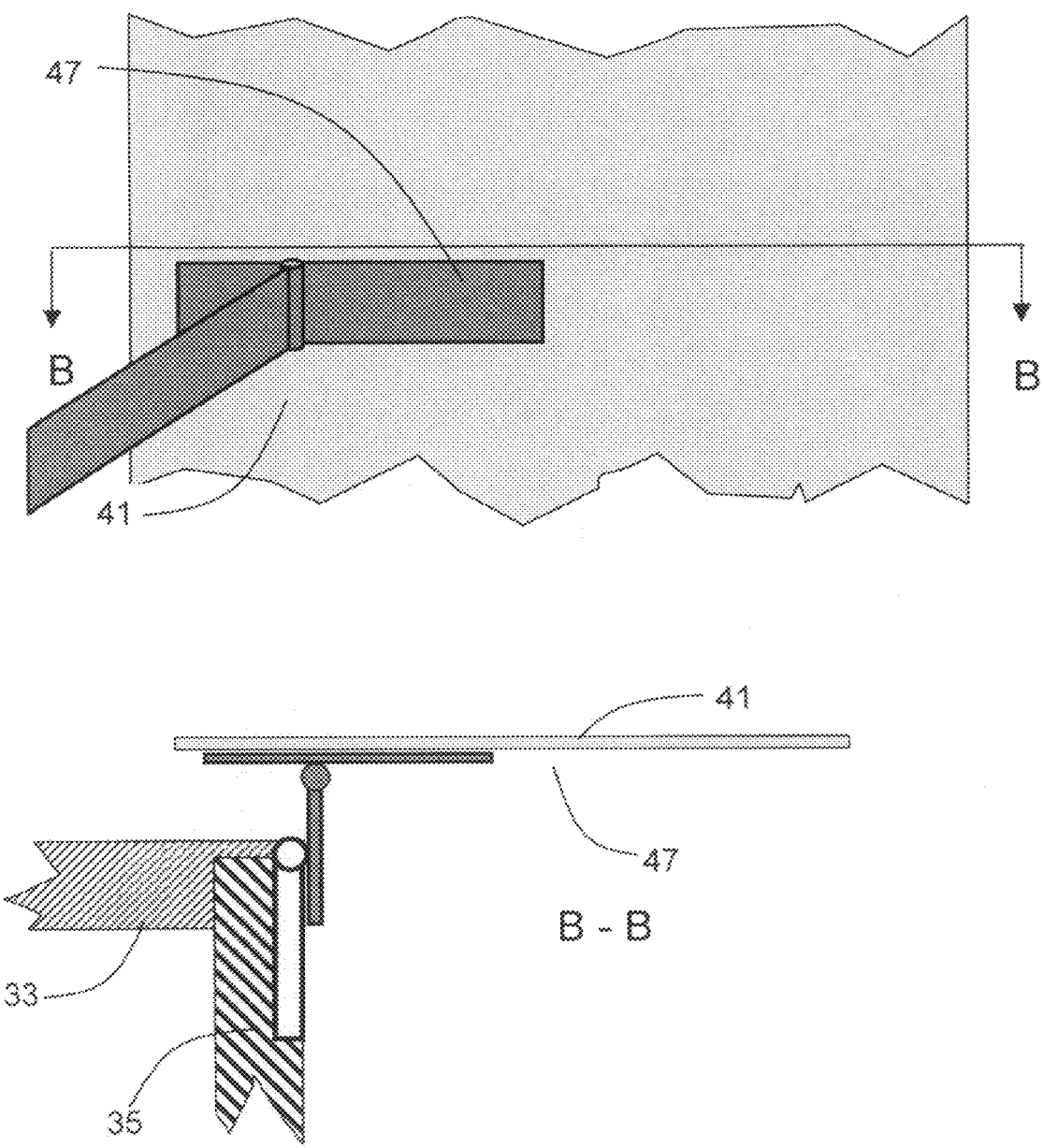
FIG. 11c details of the representative device mounted manually operated movement mechanism for the movable version of the subject invention installed on the trailer with swing doors.

FIG. 11a through FIG. 11c shows a rear perspective view and details of the aft portion of a trailer 30 of a tractor-trailer truck configured with a movable version of the subject invention 40 installed on the trailer 30. Shown in FIG. 11a is a typical swing door trailer 30 of a tractor-trailer truck with the subject invention 40 installed on the trailer 30. The subject invention 40 attaches to the trailer 30 by means of attachment/actuation hardware 47. The panel 41 has width W1 and length L1. The panel 41 is laterally offset from the side surface 32 and 33 a distance Y and the panel leading edge is positioned in close proximity to the vehicle side surface 32 and 33 trailing edge at a distance X. The panel 41 attaches to the actuation/attachment hardware 47 that in turn attaches to the vehicle 30.

Shown in FIG. 11b is a typical swing door trailer 30 of a tractor-trailer truck with the subject invention 40 installed on the trailer 30. Also shown in FIG. 11b is an expanded view of one embodiment of attachment/actuation hardware 47. The subject invention 40 attaches to the trailer 30 by means of attachment/actuation hardware 47. The actuation hardware 44 represented in the figure is a hinged mechanism that may be manually operated or powered. FIG. 11c shows additional details of a typical actuation hardware 47.

FIG. 12 show representative planform shapes of panels 41 and 45 of the invention 40. Panel 41 has width W1 and length L1 and panel 45 has width W2 and length L2. FIG. 12 show four representative panel shapes; Baseline, $1^{st}$ Alternate Embodiment, $2^{nd}$ Alternate Embodiment, and $3^{rd}$ Alternate Embodiment. The Baseline panel planform shape is rectangular. The $1^{st}$ Alternate Embodiment has a straight leading edge and triangular notched trailing edge. The $2^{nd}$ Alternate Embodiment has a straight leading edge and curved notched trailing edge. The $3^{rd}$ Alternate Embodiment is rectangular with rounded corners. The planform shapes shown are representative of possible shapes and are intended to be examples only and are not intended the limit the possible shapes that are used.

FIG. 13 show representative airfoil shapes of panels 41 and 45 of the invention 40. Panel 41 has width W1 and length L1 and panel 45 has width W2 and length L2. FIG. 13 show seven representative panel shapes; Thin Plate, Thick Plate, Rounded Edges, Symmetric Wedge-Slab-Wedge, Asymmetric Wedge-Slab-Wedge, Symmetric Wedge-Wedge, and Asymmetric Wedge-Wedge. The airfoil shapes shown are representative of possible shapes and are intended to be examples only and are not intended the limit the possible shapes that are used.

ADVANTAGES

From the description provided above, a number of advantages of the outboard wake stabilization plates become evident:

The invention provides a novel process to reduce the drag of a bluff-base body.
(a) The invention provides a means to use boundary layer separation methods on the side and top surfaces of a bluff-base body to reduce drag.
(b) The invention provides a means to reduce the aerodynamic drag and improve the operational efficiency of bluff-base vehicles.
(c) The invention provides a means to reduce the aerodynamic drag and improve the fuel efficiency of bluff-base vehicles.
(d) The invention provides a means to conserve energy and improve the operational efficiency of bluff-base vehicles.
(e) The invention provides a means to reduce the aerodynamic drag without a significant geometric modification to existing bluff-base vehicles.
(f) The invention may be easily applied to any existing bluff-base vehicle or designed into any new bluff-base vehicle.
(g) The invention allows for the efficient operation of the invention with a limited number of panels.
(h) The invention allows for the matching of complex surface shapes by the shaping and placement of the panels.
(i) Large reductions in drag force can be achieved by diverting the boundary layer.
(j) The structure, placement, and shape of each panel may be adapted to meet specific performance or vehicle integration requirements.
(k) The trailing edge shape of each panel may be linear or complex to meet specific performance or vehicle integration requirements.
(l) The ability to optimally position each panel on the vehicle rear surface.
(m) The ability to minimize weight and volume requirements within the vehicle.
(n) The ability to minimize maintenance requirements.
(o) The ability to minimize the impact on operational and use characteristics of the vehicle door system.
(p) The ability to maximize the safety of vehicle operation.

CONCLUSION, RAMIFICATIONS, AND SCOPE

Accordingly, the reader will see that the outboard wake stabilization device can be used to easily and conveniently reduce aerodynamic drag on any ground vehicle for the purposes of improving the operational performance of the vehicle. Furthermore, the panels comprising the outboard wake stabilization device has the additional advantages in that:

it provides a aerodynamic drag reduction force over the base of the vehicle;
it allows the contour of the host surface to be easily matched;
it allows easy application to any existing vehicle or designed into any existing vehicle;
it allows the device to be fabricated as an independent unit that may be applied to an existing surface;
it allows for optimal positioning of each panel on the vehicle;
it allows the design of a system with minimum weight and to require minimum volume within the vehicle;
it allows minimum maintenance requirements;
it allows minimum impact on door operation and use.
it allows for the maximum safety of vehicle operation;

Although the description above contains many specificities, these should not be construed as limiting the scope of the invention but as merely providing illustrations of some of the presently preferred embodiments of this invention. For example, the panels can be composed of various planar shapes such as ellipsoid, quadratic, etc.; the thickness and width can vary along the length; the material can be any light-weight and structurally sound material such as wood, plastic, metal, composites, etc.; the substrate can be any metal, wood, plastic, composite, rubber, ceramic, etc.; the application surface can be that of a metal, wood, plastic, composite, rubber, ceramic, etc. The attachment and actuation hardware can be either conventional off the shelf or designed specifically for the subject invention.

The invention has been described relative to specific embodiments thereof and relative to specific vehicles, it is not so limited. The invention is considered applicable to any road vehicle including automobiles, trucks, buses, trains, recreational vehicles and campers. The invention is also considered applicable to non-road vehicles such as hovercraft, watercraft, aircraft and components of these vehicles. It is to be understood that various modifications and variation of the specific embodiments described herein will be readily apparent to those skilled in the art in light of the above teachings without departing from the spirit and scope.

Thus, the scope of the invention should be determined by the appended claims and their legal equivalents, rather than by the examples given.

The invention claimed is:

1. An apparatus for reducing the aerodynamic drag of a body having a bluff base, a top, a front, a bottom, a first side, and a second side, the bluff base having a left half and a right half on either side of the centerline, the apparatus comprising:
    a first substantially rectangular side panel;
    a second substantially rectangular side panel;
    a substantially rectangular top panel;
    each of the panels having a width, length, and thickness;
    wherein the first and second side panels are symmetrically positioned about the centerline of the bluff base in opposition and the top panel is positioned symmetrically about the bluff base centerline, wherein the first side panel is attached to the first side of the body, the second side panel is attached to the second side of the body and the top panel is attached to the top of the body so that the first side panel extends aft and is approximately parallel to the first side of the body, the second side panel extends aft and is approximately parallel to the second side of the body and the top panel extends aft and is approximately parallel to the top of the body and each panel is positioned longitudinally such that a leading edge of the panel is positioned forward of, and in close proximity to, a corresponding trailing edge of the body, wherein each of the first and second side panels is set outboard in close proximity to, and at substantially similar distances from, the respective side of the body a distance less than 25 percent of a width of the body, each of the first and second side panels being positioned to define a side gap between the side panel and the respective side of the body, wherein the top panel is set above the body top surface in close proximity to the top body surface a distance less than 25 percent of the body width, the top panel being positioned to define a top gap between the top panel and the top body surface;
    wherein the width of each of the first and second side panels is less than the body width, the thickness of each of the first and second side panels is less than 25 percent of the body width, and the length of each of the first and second side panels is substantially equivalent to the vertical height of the body bluff base;
    wherein the width of the top panel is less than the body width, the thickness of the top panel is less than 25 percent of the body width, and the length of the top panel is substantially equivalent to the width of the body bluff base;
    wherein each of the first and second side panels defines an outer surface facing in the same direction as the corresponding side of the body and an inward surface facing the opposing side panel, and each of the first and second side panels is configured, when exposed to a flow of air along the body, to separate the low energy and low velocity boundary layer air passing over the sides of the body from the high velocity external free-stream air; and
    wherein each of the first and second side panels is configured, when exposed to the flow of air along the body, to direct the low energy boundary layer air through the side gap between the side panel and the respective side of the body and into the region immediately downstream of the bluff base, enabling the high velocity free stream air to continue aft along the outer facing surface of each side panel where the air will exit the side panel trailing edge and expand into the base area region downstream of the low energy boundary layer air;
    wherein the top panel defines an outer surface facing in the same direction as the corresponding top of the body and an inward surface facing downward, and the top panel is configured, when exposed to the flow of air along the body, to separate the low energy and low velocity boundary layer air passing over the top of the body from the high velocity external free-stream air; and
    wherein the top panel is configured, when exposed to the flow of air along the body, to direct the low energy boundary layer air through the top gap between the top panel and the top body surface and into the region immediately downstream of the bluff base, enabling the high velocity free stream air to continue aft along the outer facing surface of the top panel where the air will exit the top panel trailing edge and expand into the base area region downstream of the low energy boundary layer air.

2. The apparatus of claim 1, wherein the right-side edge of the top panel is joined to the adjacent upper-side edge of the first side panel and the left-side edge of the top panel is joined to the adjacent upper-side edge of the second side panel to form a single inverted U shaped structure.

3. The apparatus of claim 1, wherein the lengthwise trailing edge of each panel is linear and parallel to the body bluff base.

4. The apparatus of claim 1, wherein the streamwise cross-sectional shape of each panel is of constant thickness.

5. The apparatus of claim 1, wherein the leading edge of each panel is aerodynamically sharp.

6. The apparatus of claim 1, wherein the trailing edge of each panel is aerodynamically sharp.

7. The apparatus of claim 1, wherein the streamwise cross-sectional shape of each panel is diamond shaped.

8. The apparatus of claim 1, wherein the streamwise cross-sectional shape of each panel is triangular shaped.

9. The apparatus of claim 1, wherein the streamwise cross-sectional shape of each panel is airfoil shaped.

10. The apparatus of claim 1, wherein the body is a vehicle having swinging rear doors on the left half and the right half of the bluff base, and further comprising control means connected between the vehicle and each panel for maintaining each panel in an operating position and for stowing each panel when not in use.

11. The apparatus of claim 1, wherein the body is a vehicle having a rollup rear door on the base, and further comprising control means connected between the vehicle and each panel for maintaining each panel in an operating position and for stowing each panel when not in use.

12. An apparatus in accordance with claim 10 wherein said control means comprises:
    a first slide system connecting the first side panel to the first side of the body,
    a second slide system connecting the second side panel to the second side of the body, a third slide system connecting the top panel to the top of said body.

13. An apparatus in accordance with claim 10 wherein said control means for maintaining each said panel in an operating position and to allow each said panel to move to a stowed position further comprising:
   a first powered slide system connecting the first side panel to the first side of the body,
   a second powered slide system connecting the second side panel to the second side of the body,
   a third powered slide system connecting the top panel to the top of said body,
   said control means to maintain each said panel in operating position includes a slide compression force and mechanical stop means for preventing forward movement of said first side panel from said operating position and preventing forward movement of said second side panel from said operating position and preventing forward movement of said top panel from said operating position,
   said control means includes means to allow said first side panel to slide from said operating position towards front of the vehicle and to allow said second side panel slide from said operating position towards front of the vehicle and to allow said top panel slide from said operating position towards front of the vehicle when said rear swinging doors are opened or when the trailing edges of said panels impact an object.

14. An apparatus in accordance with claim 11 wherein said control means comprises:
   a first slide system connecting the first side panel to the first side of the body,
   a second slide system connecting the second side panel to the second side of the body,
   a third slide system connecting the top panel to the top of said body.

15. An apparatus in accordance with claim 11 wherein said control means for maintaining each said panel in an operating position and to allow each said panel to move to a stowed position further comprising:
   a first powered slide system connecting first said panel to right half of said vehicle,
   a second powered slide system connecting second said panel to left half of said vehicle,
   a third powered slide system connecting third said panel to top of said vehicle,
   said control means to maintain each said panel in operating position includes a slide compression force and mechanical stop means for preventing forward movement of said right half panel from said operating position and preventing forward movement of said left half panel from said operating position and preventing forward movement of said top panel from said operating position,
   said control means includes means to allow said right half panel to slide from said operating position towards front of the vehicle and to allow said left half panel slide from said operating position towards front of the vehicle and to allow said top panel slide from said operating position towards front of the vehicle when said rear rollup door is opened or when the trailing edges of said panels impact an object.

* * * * *